US009836251B2

(12) United States Patent
Maeda

(10) Patent No.: US 9,836,251 B2
(45) Date of Patent: Dec. 5, 2017

(54) IMAGE FORMATION APPARATUS, TERMINAL APPARATUS, AND INFORMATION PROCESSING APPARATUS FOR REMOTELY CONTROLLING AN IMAGE FORMATION APPARATUS WITHIN AN IMAGE PROCESSING SYSTEM

(71) Applicant: Konica Minolta, Inc., Chiyoda-ku, Tokyo (JP)

(72) Inventor: Toshihiro Maeda, Sakai (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/928,287

(22) Filed: Oct. 30, 2015

(65) Prior Publication Data

US 2016/0124686 A1   May 5, 2016

(30) Foreign Application Priority Data

Oct. 31, 2014   (JP) ................................ 2014-223137
Mar. 25, 2015   (JP) ................................ 2015-062428

(51) Int. Cl.
*G06F 3/12* (2006.01)

(52) U.S. Cl.
CPC .......... *G06F 3/1204* (2013.01); *G06F 3/1238* (2013.01); *G06F 3/1261* (2013.01);
(Continued)

(58) Field of Classification Search
CPC .................................................... G06F 3/1204
(Continued)

(56) References Cited

U.S. PATENT DOCUMENTS 6,369,909 B1   4/2002   Shima
8,593,665 B2   11/2013   Ito
(Continued)

FOREIGN PATENT DOCUMENTS

JP   8-139843 A    5/1996
JP   11-184649 A   7/1999
(Continued)

OTHER PUBLICATIONS

Office Action (Notice of Grounds of Rejection) dated Nov. 29, 2016 issued by the Japanese Patent Office in corresponding Japanese Patent Application No. 2014-223137, and English language translation of Office Action (6 pages).
(Continued)

*Primary Examiner* — Jacky X Zheng
(74) *Attorney, Agent, or Firm* — Buchanan, Ingersoll & Rooney PC

(57) ABSTRACT

In an image processing system including a plurality of MFPs, it is assumed that a terminal apparatus accepts a request for connection to an MFP from a user. When a remote operation of the MFP through the terminal apparatus cannot be performed, the terminal apparatus requests of another MFP different from the MFP for connection and receives transfer of representation information for displaying an operation screen from another MFP. The terminal apparatus transfers operation information representing an operation by the user onto the operation screen to another MFP. When the processing based on the operation information is processing of a print job by the user in the MFP, another MFP transfers the print job to the MFP.

6 Claims, 17 Drawing Sheets

(52) U.S. Cl.
CPC .......... *G06F 3/1273* (2013.01); *G06F 3/1291* (2013.01); *G06F 3/1292* (2013.01)

(58) Field of Classification Search
USPC ................................................ 358/1.14, 1.15
See application file for complete search history.

(56) References Cited

U.S. PATENT DOCUMENTS

| | | | |
|---|---|---|---|
| 2003/0063313 A1 | 4/2003 | Ito | |
| 2013/0141760 A1* | 6/2013 | Mori | G06F 3/1201 358/1.15 |
| 2015/0350461 A1* | 12/2015 | Kim | H04N 1/0096 358/1.13 |
| 2015/0365552 A1* | 12/2015 | Matsuhara | H04N 1/00307 358/1.15 |

FOREIGN PATENT DOCUMENTS

| | | |
|---|---|---|
| JP | 2003-209659 A | 7/2003 |
| JP | 2004-213194 A | 7/2004 |
| JP | 2005-210375 A | 8/2005 |
| JP | 2007-26466 A | 2/2007 |
| JP | 2007-79639 A | 3/2007 |
| JP | 2008-152535 A | 7/2008 |
| JP | 2008-186270 A | 8/2008 |
| JP | 2011-81741 A | 4/2011 |
| JP | 2013-191000 A | 9/2013 |
| JP | 2013-210860 A | 10/2013 |

OTHER PUBLICATIONS

Japanese Office Action ("Notice of Grounds of Rejection") issued on Jun. 6, 2017, by the Japanese Patent Office in corresponding Japanese Patent Application No. 2015-062428 and English translation of the Office Action (9 pages).

* cited by examiner

IMAGE FORMATION APPARATUS, TERMINAL APPARATUS, AND INFORMATION PROCESSING APPARATUS FOR REMOTELY CONTROLLING AN IMAGE FORMATION APPARATUS WITHIN AN IMAGE PROCESSING SYSTEM

This application is based on Japanese Patent Applications Nos. 2014-223137 and 2015-062428 filed with the Japan Patent Office on Oct. 31, 2014 and Mar. 25, 2015, respectively, the entire content of which is hereby incorporated by reference.

BACKGROUND OF THE INVENTION

Field of the Invention

This disclosure relates to an image formation apparatus, a terminal apparatus, and an information processing apparatus.

Description of the Related Art

Image formation apparatuses such as multi-functional peripherals (MFPs) may constitute an image processing system. In the system, a job is stored in an image formation apparatus or a server included in the system. A user can indicate processing of a job by issuing a job to the system through such a processing apparatus as a personal computer (PC) and thereafter logging in an image formation apparatus. Such a method of processing a job is also called ubiquitous printing.

In order to realize ubiquitous printing, the user performs an operation to log in an image formation apparatus included in the system. When logging in the image formation apparatus is successful, the image formation apparatus obtains information on a job from an apparatus which stores a job issued by the user in the system. Then, the image formation apparatus which has received log-in obtains a job designated among jobs issued by the user from an apparatus which stores jobs, and processes the job.

In such a system, information on processing of a job for each user or each user group may collectively be managed, because an upper limit for an amount of processing of jobs is set for each user or fees are charged based on an amount of processing of jobs. In order to realize this collective management, the system includes a server for management and the server counts an amount of processing of jobs for each user or each user group.

The system, however, may include an image formation apparatus which does not have a function to perform log-in processing or a function to communicate with a server. The system may also include an image formation apparatus which can no longer perform further processing of jobs because of high processing load. In such a case, the user cannot indicate job processing by logging in that image formation apparatus, which lowers convenience of the user.

In order to address such a problem, for example, Japanese Laid-Open Patent Publication No. 2013-191000 discloses a technique for a printer without an authentication function to have another apparatus perform that function instead. In a case of a system not having an authentication server, however, this technique cannot be made use of.

Japanese Laid-Open Patent Publication No. 2003-209659 discloses a technique allowing a remote operation through another apparatus. With the technique in Japanese Laid-Open Patent Publication No. 2003-209659, however, system information on an apparatus itself is transferred to another apparatus and the system information is used in another apparatus. Therefore, in a case of an image formation apparatus which cannot perform log-in processing or job processing as above, the image formation apparatus cannot remotely be operated through another apparatus even with the use of the technique in Japanese Laid-Open Patent Publication No. 2003-209659.

Japanese Laid-Open Patent Publication No. 2008-186270 discloses a system which transfers data in accordance with a state of equipment. Japanese Laid-Open Patent Publication No. 2013-210860 discloses a technique for giving a notification, through printing, about a reason why a job cannot be printed in an apparatus low in panel display function, when a print job cannot be printed on a designated printer.

SUMMARY OF THE INVENTION

An object in one aspect of the present disclosure is to improve convenience of a user.

An object in another aspect of the present disclosure is to improve convenience of a user of a system including an image formation apparatus and an information processing apparatus and to allow appropriate management of job processing.

According to one embodiment, an image formation apparatus includes a transfer unit that transfers representation information for displaying an operation screen of the image formation apparatus to a display apparatus, an input unit that accepts input of operation information representing an operation by a user onto the operation screen displayed on the display apparatus based on the representation information, an access unit that accesses one or more print jobs associated with the user, an obtaining unit that obtains information for specifying the print job associated with the user from the print job, a display control unit that has the display apparatus display the specifying information, a designation unit that accepts designation of a print job to be processed, from among one or more print jobs associated with the user, based on the operation information, a specifying unit that specifies a processing apparatus that processes the print job designated to be processed, and an issuance unit that issues the print job to another image formation apparatus when the processing apparatus is another image formation apparatus different from the image formation apparatus.

Preferably, the display apparatus is mounted on a terminal apparatus. The specifying unit specifies information representing the processing apparatus for the print job designated by the user based on the operation information.

Preferably, the display apparatus includes a display apparatus mounted on a terminal apparatus and a display apparatus mounted on the image formation apparatus. The specifying unit specifies the processing apparatus as the image formation apparatus when the display apparatus mounted on the image formation apparatus displays the operation screen.

Preferably, when the image formation apparatus accepts designation of the print job to be processed from a plurality of display apparatuses, processing in response to acceptance of designation of the print job for which the image formation apparatus serves as the processing apparatus has precedence over transfer to another image formation apparatus, of a print job for which another image formation apparatus serves as the processing apparatus in response to acceptance of designation of the print job for which another image formation apparatus serves as the processing apparatus.

Preferably, when the image formation apparatus accepts designation of the print job to be processed from a plurality of display apparatuses, processing in response to acceptance of designation of the print job for which the image formation apparatus serves as the processing apparatus is performed in parallel to transfer to another image formation apparatus, of a print job for which another image formation apparatus serves as the processing apparatus in response to acceptance of designation of the print job for which another image formation apparatus serves as the processing apparatus.

According to another embodiment, a terminal apparatus can remotely operate an image formation apparatus. This terminal apparatus includes a designation unit that accepts designation of an image formation apparatus to remotely be operated, a request unit that requests of the image formation apparatus for representation information for displaying an operation screen, a transfer unit that transfers operation information representing an operation by a user onto the operation screen displayed based on the representation information to the image formation apparatus which has passed the representation information to the terminal apparatus, and a determination unit that determines whether or not the image formation apparatus designated by the designation unit is the image formation apparatus which can remotely be operated. When the designated image formation apparatus is not the image formation apparatus which can remotely be operated, the request unit requests of another image formation apparatus stored in advance, which is different from the designated image formation apparatus, for the representation information. The transfer unit transfers the operation information to another image formation apparatus together with information specifying the designated image formation apparatus.

Preferably, the determination unit determines whether or not the image formation apparatus can remotely be operated in accordance with at least one of a function of the designated image formation apparatus and a condition of processing.

According to another embodiment, a non-transitory computer-readable storage medium storing a program for controlling a terminal apparatus that can communicate with an image formation apparatus is provided. This control program causes a computer mounted on the terminal apparatus to perform accepting a request for connection to a first image formation apparatus from a user, determining whether or not the first image formation apparatus can remotely be operated through the terminal apparatus, requesting of a second image formation apparatus different from the first image formation apparatus for connection when the first image formation apparatus cannot remotely be operated through the terminal apparatus, accepting input of representation information for displaying an operation screen of the second image formation apparatus from the second image formation apparatus, in response to a request from the terminal apparatus, and transferring to the second image formation apparatus, operation information representing an operation by the user onto the operation screen displayed on the terminal apparatus based on the representation information.

According to another embodiment, an information processing apparatus is connected to be able to communicate with an image formation apparatus without a prescribed function and has the prescribed function. The information processing apparatus includes an authentication unit that authenticates a user, a designation unit that designates the image formation apparatus as an image formation apparatus to print a print job of the approved user, an issuance unit that issues an instruction for printing of the print job to the designated image formation apparatus, together with user information specifying the user and substitute apparatus information specifying the information processing appara-tus, and an obtaining unit that obtains a result of printing associated with the user information from the image formation apparatus.

Preferably, the information processing apparatus is an image formation apparatus that has an authentication function.

Preferably, the information processing apparatus is a portable terminal that has an authentication function.

Preferably, the prescribed function is an authentication function.

Preferably, the prescribed function is a function to read a job from another apparatus.

Preferably, the prescribed function is a function to transmit a result of printing to a management server.

Preferably, the information processing apparatus is configured to indicate to a user, the information processing apparatus as an apparatus to be logged in.

According to another embodiment, a non-transitory computer-readable storage medium storing a program for controlling an information processing apparatus which is connected to be able to communicate with an image formation apparatus without a prescribed function and has the prescribed function is provided. This control program causes a computer mounted on the information processing apparatus to perform authenticating a user, designating the image formation apparatus as an image formation apparatus to print a print job of the approved user, issuing an instruction for printing of the print job to the designated image formation apparatus together with user information specifying the user and substitute apparatus information specifying the information processing apparatus, and obtaining a result of printing associated with the user information from the image formation apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
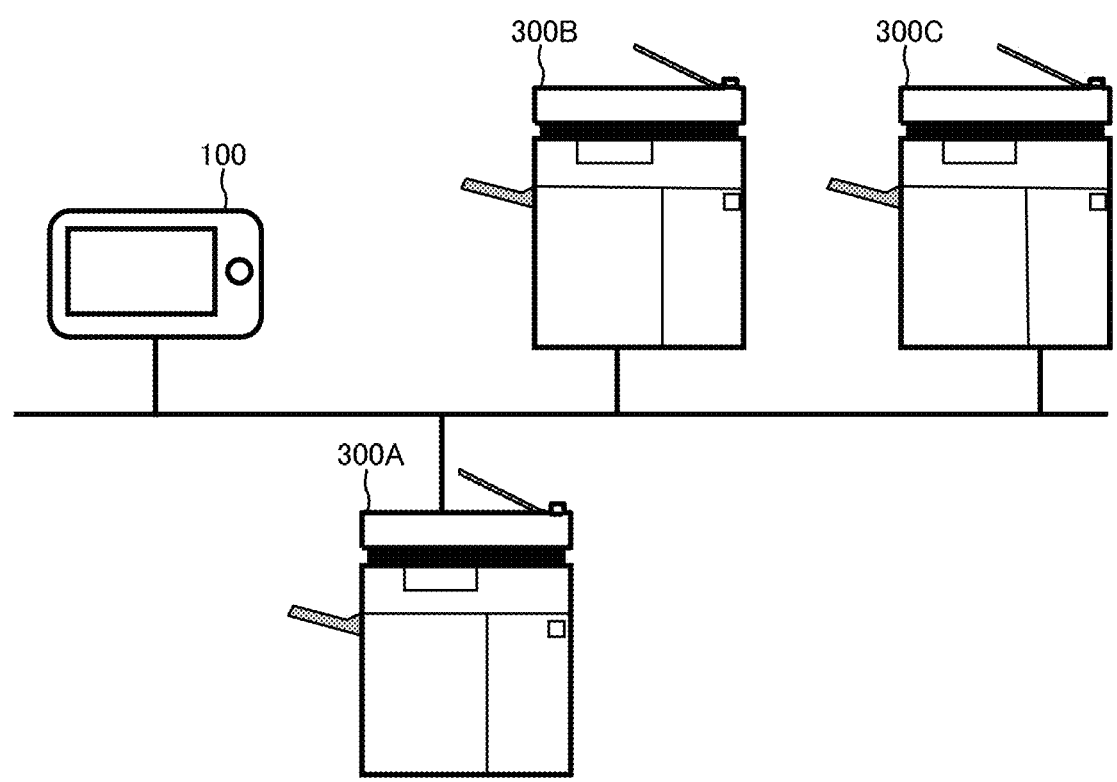
FIG. 1 is a diagram representing one example of a configuration of an image processing system (hereinafter simply referred to as a system) according to an embodiment.

An embodiment of the present invention will be described hereinafter with reference to the drawings. In the description below, the same elements and components have the same reference characters allotted. Their label and function are also identical. Therefore, detailed description thereof will not be repeated.

[First Embodiment]

<System Configuration>

FIG. 1 is a diagram representing one example of a configuration of an image processing system (hereinafter simply referred to as a system) according to the present embodiment. Referring to FIG. 1, the present system includes a terminal apparatus 100 and multi-functional peripherals (MFPs) 300A, 300B, and 300C representing one example of an image formation apparatus. The plurality of MFPs 300A, 300B, and 300C are also collectively referred to as an MFP 300.

Terminal apparatus 100 and MFP 300 are connected to each other to be able to communicate. Communication between terminal apparatus 100 and MFP 300 may be wireless communication such as infrared communication or communication via a network such as local area network (LAN).

Terminal apparatus 100 should only be an apparatus having a communication function, a display function, and an operation input function. Terminal apparatus 100 is, for example, an apparatus also called a tablet. Terminal apparatus 100 may be implemented by a common personal computer (PC).

<Apparatus Configuration>

Figure 2:
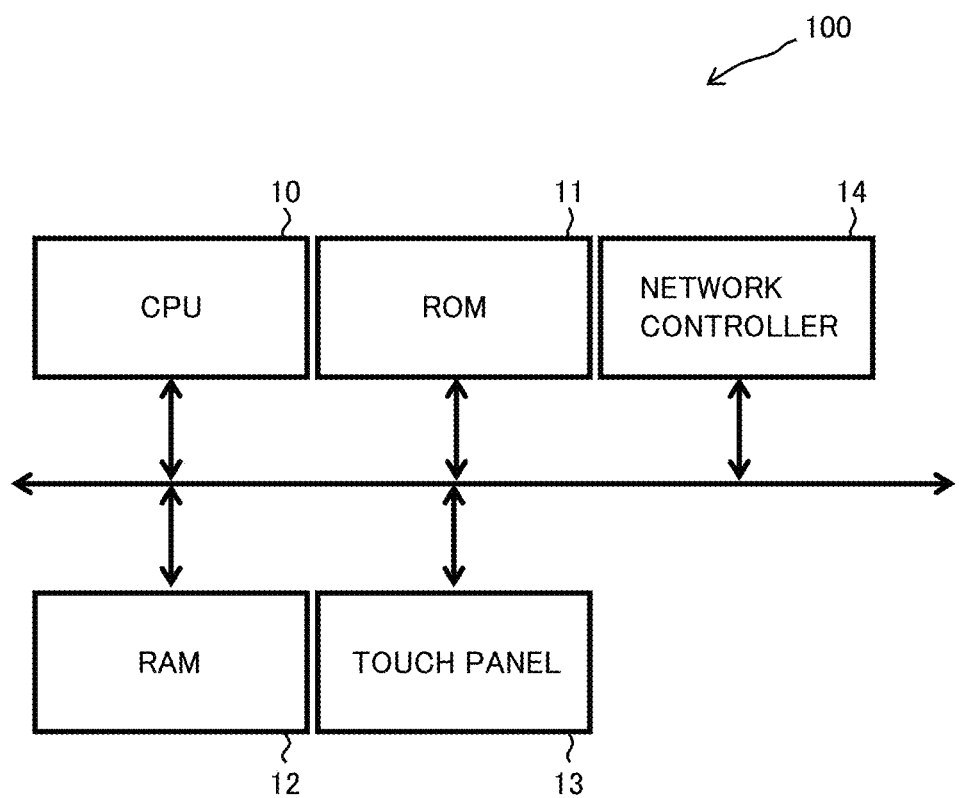
FIG. 2 is a block diagram showing a specific example of an apparatus configuration of a terminal apparatus included in the system.

FIG. 2 is a block diagram showing a specific example of an apparatus configuration of terminal apparatus 100. Referring to FIG. 2, terminal apparatus 100 includes a central processing unit (CPU) 10 for overall control of an apparatus. Terminal apparatus 100 includes a read only memory (ROM) 11 for storing a program executed by CPU 10 or other data and a random access memory (RAM) 12 for storing a calculation value or serving as a work area in execution of a program by CPU 10. Terminal apparatus 100 includes a touch panel 13 and a network controller 14. Network controller 14 controls communication between terminal apparatus 100 and MFP 300.

Figure 3:
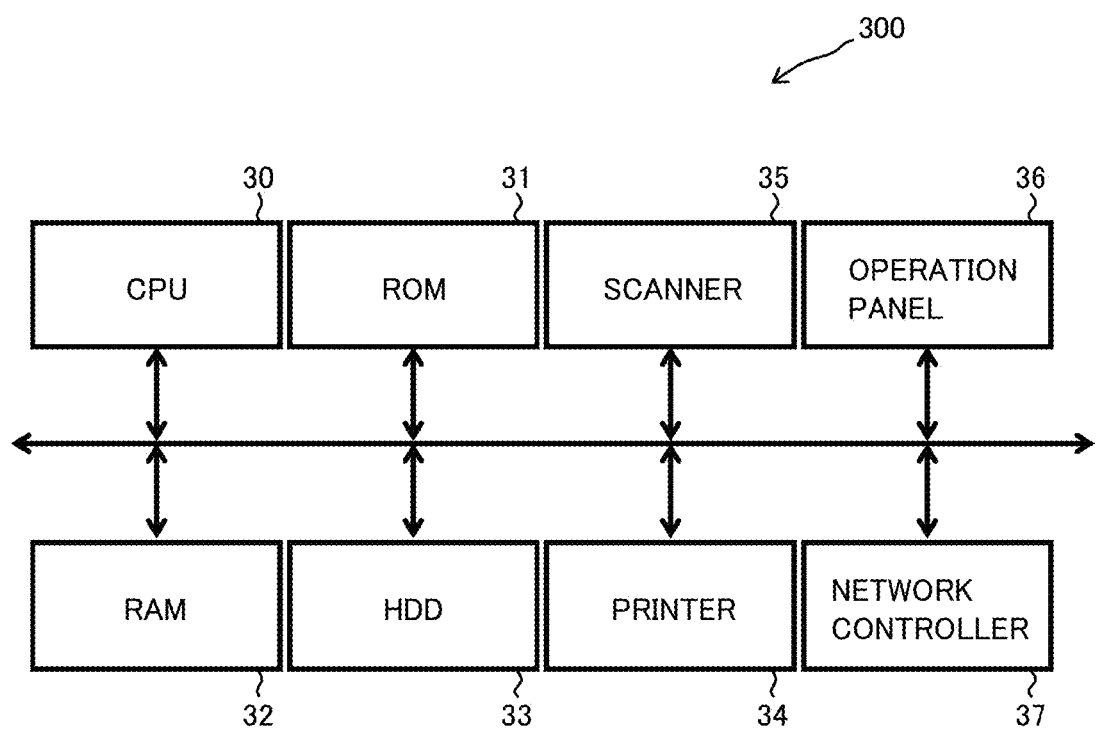
FIG. 3 is a block diagram showing a specific example of an apparatus configuration of a multi-functional peripheral (MFP) included in the system.

FIG. 3 is a block diagram showing a specific example of an apparatus configuration of MFP 300. Referring to FIG. 3, MFP 300 includes a CPU 30 for overall control of an apparatus. MFP 300 includes a ROM 31 for storing a program executed by CPU 30, a RAM 32 serving as a work area in execution of a program by CPU 30, and a hard disk drive (HDD) 33 for storing image data or the like. MFP 300 includes a printer 34 and a scanner 35 as one example of an image formation mechanism. MFP 300 includes an operation panel 36 and a network controller 37. Network controller 37 controls communication between MFP 300 and terminal apparatus 100.

<Operation Overview>

A user issues a print job to the present system through a processing apparatus (not shown) such as a PC The print job is stored in any MFP brought in correspondence in advance with the user, an MFP allocated at the time of issuance, or another apparatus (not shown) such as a server. An MFP which stores a job issued by a user is also referred to as a storage MFP.

Thereafter, the user logs in any MFP. The MFP in which the user has logged is also referred to as a log-in MFP. The log-in MFP inquires of each MFP in the system about presence of a job associated with the user who has logged in, and obtains job information. Namely, the log-in MFP accesses one or more jobs in the system, which are associated with the user who has logged in, and obtains job information from the job. The job information is, for example, information for specifying the job such as a job name or a time and day of creation of the job.

The log-in MFP presents to the user who has logged in, job information on one or more jobs associated with the user and stored in any MFP in the present system, in a selectable manner. The user selects a job to be printed in a selection screen. Selection of a job may be made with a method of selecting an option brought in correspondence with job information or a method of entering job information such as a job name.

The log-in MFP obtains the selected job from an MFP which stores the job, and performs printing processing.

Thus, in the present system, the user can carry out printing of a designated job by logging in any MFP in the system without being conscious about in which apparatus a job issued by the user is stored.

Terminal apparatus 100 incorporates an application for implementing a function called what is called remote panel. Terminal apparatus 100 executes the application and accepts designation of an MFP to be logged in from the user. Then, terminal apparatus 100 obtains information for displaying an operation screen by accessing designated MFP 300, and has touch panel 13 display an operation screen of designated MFP 300. When terminal apparatus 100 accepts an operation (touch) by the user onto the operation screen, it transmits information representing a position of operation to designated MFP 300. When MFP 300 accepts the information from terminal apparatus 100, it specifies contents of operation based on the information and performs processing in accordance with the operation.

Thus, the user of terminal apparatus 100 can remotely operate designated MFP 300 by using terminal apparatus 100.

The user can request of MFP 300 in which the user attempts to log for access thereto by making use of terminal apparatus 100. The user can set MFP 300 as the log-in MFP through a remote operation, by accessing MFP 300 through terminal apparatus 100.

In some cases, however, MFP 300 designated as the log-in MFP cannot remotely be operated through terminal apparatus 100. For example, when designated MFP 300 is a type low in function which does not have a user authentication function or a function to read a job from another apparatus, the MFP cannot be set as the log-in MFP through the remote operation by making use of terminal apparatus 100. Alternatively, when designated MFP 300 is in a state high in load such as when it is performing other image formation processing as well, in some cases, further processing cannot be performed and that MFP cannot be set as the log-in MFP.

In the present system, in such a case, terminal apparatus 100 requests of another MFP substituting for designated MFP 300 for connection and has another MFP perform subsequent processing. Another MFP substituting for designated MFP 300 is also referred to as a substitute MFP in the description below.

Figure 4:
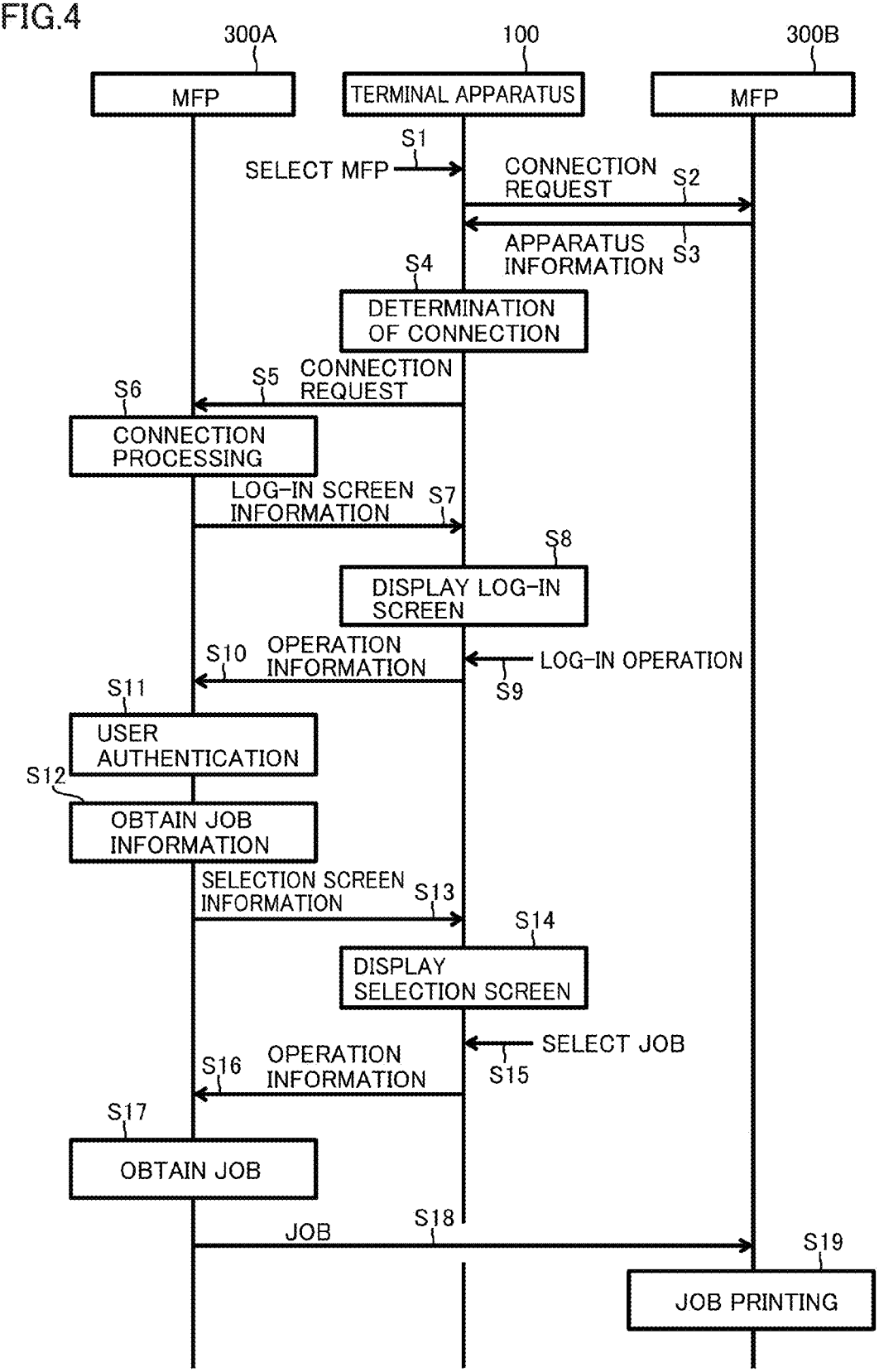
FIG. 4 is a diagram representing operation overview of the system.

FIG. 4 is a diagram representing operation overview of the present system. Referring to FIG. 4, terminal apparatus 100 starts up an application for remote panel in response to an operation by the user and accepts designation of an MFP to be set as a log-in MFP from the user (step S1). In the example in FIG. 4, terminal apparatus 100 accepts designation of MFP 300B.

Terminal apparatus 100 requests of designated MFP 300B for connection (step S2). By way of example, terminal apparatus 100 requests for information on a function as the log-in MFP in requesting of MFP 300B for connection. Terminal apparatus 100 obtains apparatus information from MFP 300B (step S3). The apparatus information received from MFP 300B is, for example, information on a function as the log-in MFP in response to the request. Alternatively, the apparatus information received from MFP 300B may be information representing a condition of processing in MFP 300B.

Terminal apparatus 100 determines based on the information from MFP 300B, whether or not designated MFP 300B can remotely be operated as the log-in MFP (step S4). When terminal apparatus 100 determines that designated MFP 300B cannot remotely be operated as the log-in MFP, it requests of another MFP different from designated MFP 300B for connection (step S5). In the example in FIG. 4, terminal apparatus 100 requests of MFP 300A for connection, as another MFP different from MFP 300B. Another MFP may be an MFP stored in advance in terminal apparatus 100. Alternatively, when it is determined that designated MFP 300B cannot remotely be operated as the log-in MFP, terminal apparatus 100 may detect an apparatus which can remotely be operated.

When terminal apparatus 100 requests of MFP 300A which is another MFP for connection, it passes information indicating designated MFP 300B to MFP 300A, together with the request.

MFP 300A which has received a connection request performs processing for remote connection such as start-up of an application for remote panel (step S6). Then, MFP 300A transfers representation information for displaying a log-in screen to terminal apparatus 100 (step S7). Terminal apparatus 100 which has received the information from MFP 300A displays the log-in screen on touch panel 13 (step S8).

When a log-in operation onto the displayed log-in screen by the user is accepted (step S9), terminal apparatus 100 transfers operation information which is information representing a position of operation to MFP 300A (step S10). The operation information includes, for example, a coordinate representing a touch position on the operation screen.

MFP 300A specifies contents of operation based on the operation information from terminal apparatus 100. Namely, MFP 300A specifies log-in information entered by the user in the log-in screen. Then, MFP 300A authenticates the user with the log-in information (step S11). When authentication is successful, MFP 300A accesses one or more jobs stored in association with the user on the present system and obtains job information on the job from the job (step S12). MFP 300A displays jobs associated with the user who has logged in in a list and generates a selection screen for presenting a job to be printed in a manner selectable from the list. Then, MFP 300A transfers representation information for displaying a selection screen to terminal apparatus 100 (step S13).

Terminal apparatus 100 which has received the representation information has the selection screen displayed on touch panel 13 based on the information (step S14). When the operation by a user to select a job in the selection screen displayed on touch panel 13 is accepted (step S15), terminal apparatus 100 transfers operation information representing the operation by the user to MFP 300A (step S16).

MFP 300A specifies contents of operation based on the operation information from terminal apparatus 100. Namely, MFP 300A specifies the selected job. Then, MFP 300A obtains the selected job from an apparatus which stores the job (step S17).

As set forth above, the connection request from terminal apparatus 100 includes information indicating MFP 300B designated through terminal apparatus 100 as a connection target by the user. Then, MFP 300A can determine that a subsequent operation is performed for MFP 300B at the time point of reception of the connection request. Alternatively, when a source of input of a control signal is terminal apparatus 100, MFP 300A may determine that it substitutes for another MFP, and when the source of input is operation panel 36, it may determine that the designated MFP is MFP 300A. Alternatively, when a document has been set on scanner 35 at the time of input of a control signal, MFP 300A may determine that the designated MFP is MFP 300A, and otherwise, it may determine that it substitutes for another MFP.

When an MFP designated by the user is MFP 300B, MFP 300A transfers the job obtained in step S17 to MFP 300B (step S18). Here, MFP 300A may transfer the job to MFP 300B after it performs processing necessary for printing of the job on the job. The job does not have to directly be transferred from MFP 300A to MFP 300B. Namely, MFP 300A may once transfer the job to terminal apparatus 100 and then terminal apparatus 100 may forward the job to MFP 300B.

MFP 300B which has accepted the job prints the job (step S19).

<Functional Configuration>

Figure 5:
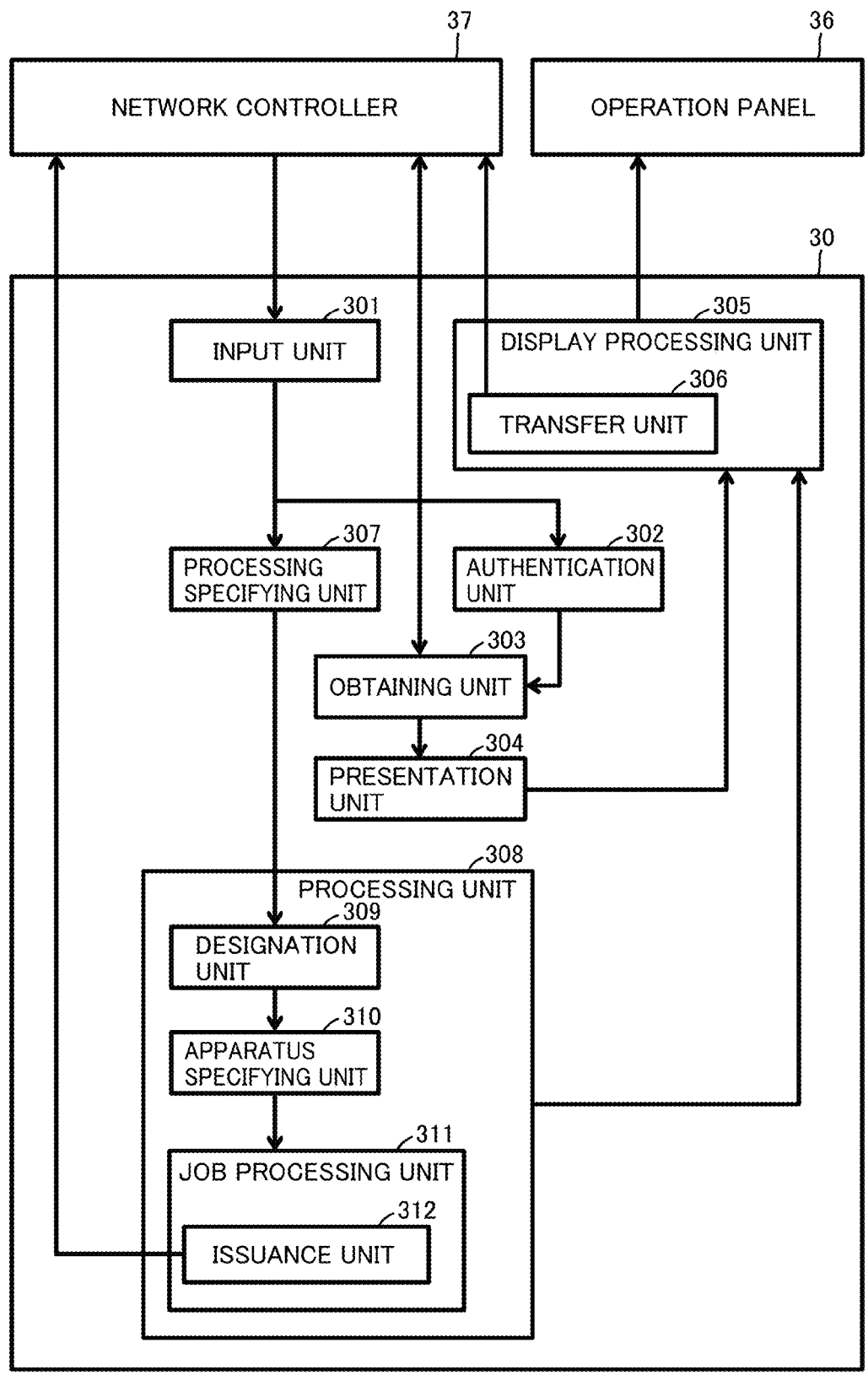
FIG. 5 is a block diagram representing one example of a functional configuration of the MFP.

FIG. 5 is a block diagram representing one example of a functional configuration of MFP 300 for performing the operations above. Each function in FIG. 5 is mainly implemented by CPU 30 as CPU 30 of MFP 300 reads a program stored in ROM 31 on RAM 32 and executes the program. A partial function, however, may be implemented by hardware shown in FIG. 3 or other hardware such as an electric circuit (not shown).

Referring to FIG. 5, CPU 30 of MFP 300 includes an input unit 301 for accepting input of operation information from terminal apparatus 100. CPU 30 includes an authentication unit 302 for authenticating a user by using log-in information when the operation information is the log-in information. CPU 30 includes an obtaining unit 303 for obtaining job information on a job associated with a user or a job when user authentication has been successful and a presentation unit 304 for presenting the job information.

CPU 30 includes a display processing unit 305. Display processing unit 305 generates screen information which is information for displaying an operation screen and performs processing for having a display apparatus display the operation screen. When the display apparatus is implemented by operation panel 36 of MFP 300, display processing unit 305 controls display on operation panel 36. Display processing unit 305 includes a transfer unit 306. When the display apparatus is implemented by touch panel 13 of terminal apparatus 100, transfer unit 306 transfers screen information to terminal apparatus 100.

CPU 30 includes a processing specifying unit 307 for specifying processing indicated based on the operation information and a processing unit 308 for performing indicated processing. Processing unit 308 performs such processing as printing, transmission, and copying of a designated job, as the indicated processing.

Processing unit 308 includes a designation unit 309, an apparatus specifying unit 310, and a job processing unit 311, as a function of processing unit 308 at the time when processing to be performed by processing unit 308 is printing of a job. Designation unit 309 accepts designation of a job to be printed. Apparatus specifying unit 310 specifies an apparatus which should print a job. When a connection request from terminal apparatus 100 includes information indicating another MFP as an MFP designated by the user through terminal apparatus 100 as a connection target, apparatus specifying unit 310 specifies an apparatus which should print a job as another MFP, based on the connection request.

Job processing unit 311 controls processing when a job is printed on MFP 300. Job processing unit 311 includes an issuance unit 312 for issuing a job. When an apparatus which should print a job is another MFP, issuance unit 312 issues a job to another MFP.

Figure 6:
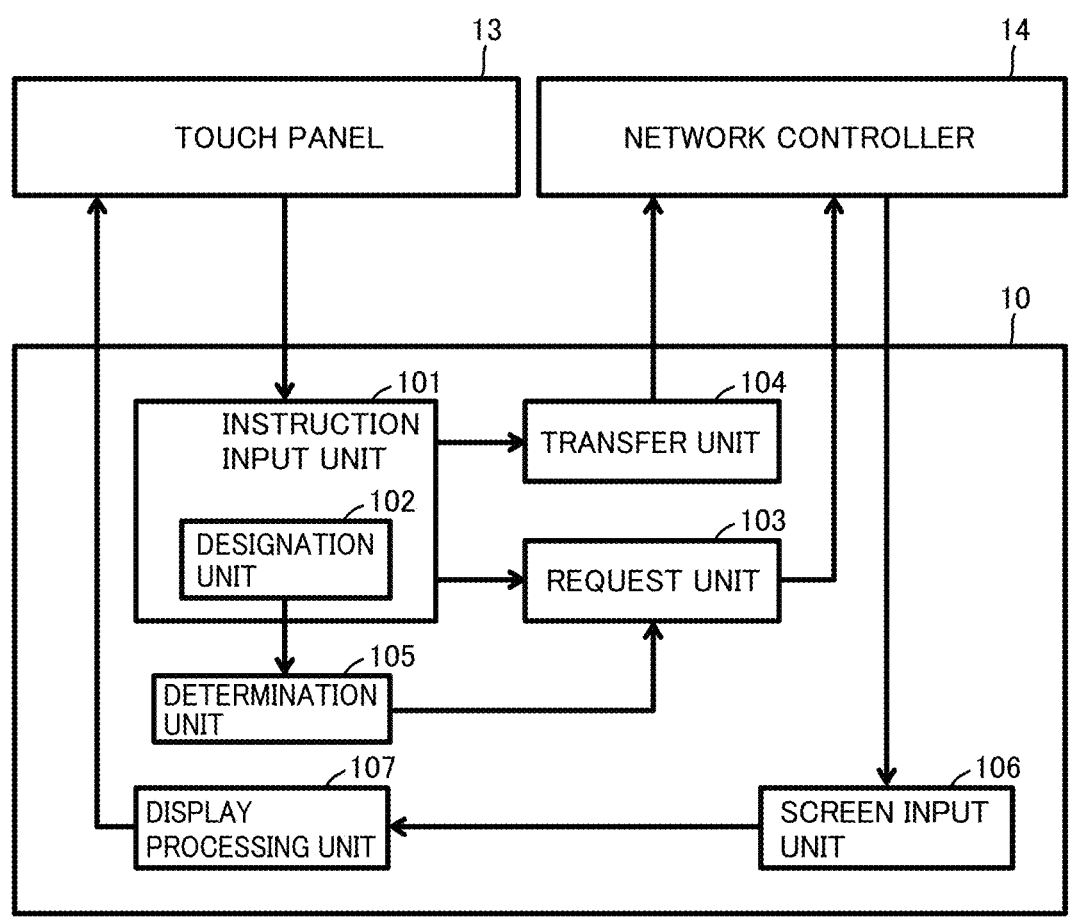
FIG. 6 is a block diagram representing one example of a functional configuration of the terminal apparatus.

FIG. 6 is a block diagram representing one example of a functional configuration of terminal apparatus 100 for performing the operations above. Each function in FIG. 6 is mainly implemented by CPU 10 as CPU 10 of terminal apparatus 100 reads a program stored in ROM 11 on RAM 12 and executes the program. A partial function, however, may be implemented by hardware shown in FIG. 2 or other hardware such as an electric circuit (not shown).

Referring to FIG. 6, CPU 10 of terminal apparatus 100 includes an instruction input unit 101 for accepting an instruction input representing an operation by a user onto touch panel 13. Instruction input unit 101 includes a designation unit 102 for accepting designation of an MFP to remotely be operated through terminal apparatus 100.

CPU 10 further includes a request unit 103, a transfer unit 104, a determination unit 105, a screen input unit 106, and a display processing unit 107. Determination unit 105 determines whether or not an MFP designated as an MFP to which connection is requested for can remotely be operated through terminal apparatus 100, based on at least one of a function of the designated MFP and a condition of processing. When determination unit 105 determines that the MFP designated as the MFP to which connection is requested for can remotely be operated, request unit 103 requests of designated MFP 300 for connection. When determination unit 105 determines that the MFP designated as the MFP to which connection is requested for cannot remotely be operated, request unit 103 requests of another MFP 300 stored in advance for connection.

Screen input unit 106 accepts input of screen information from MFP 300 to which connection has been requested for. Display processing unit 107 has touch panel 13 display an operation screen of MFP 300 to which connection has been requested for, based on the screen information.

<Operation Flow>

Figure 7:
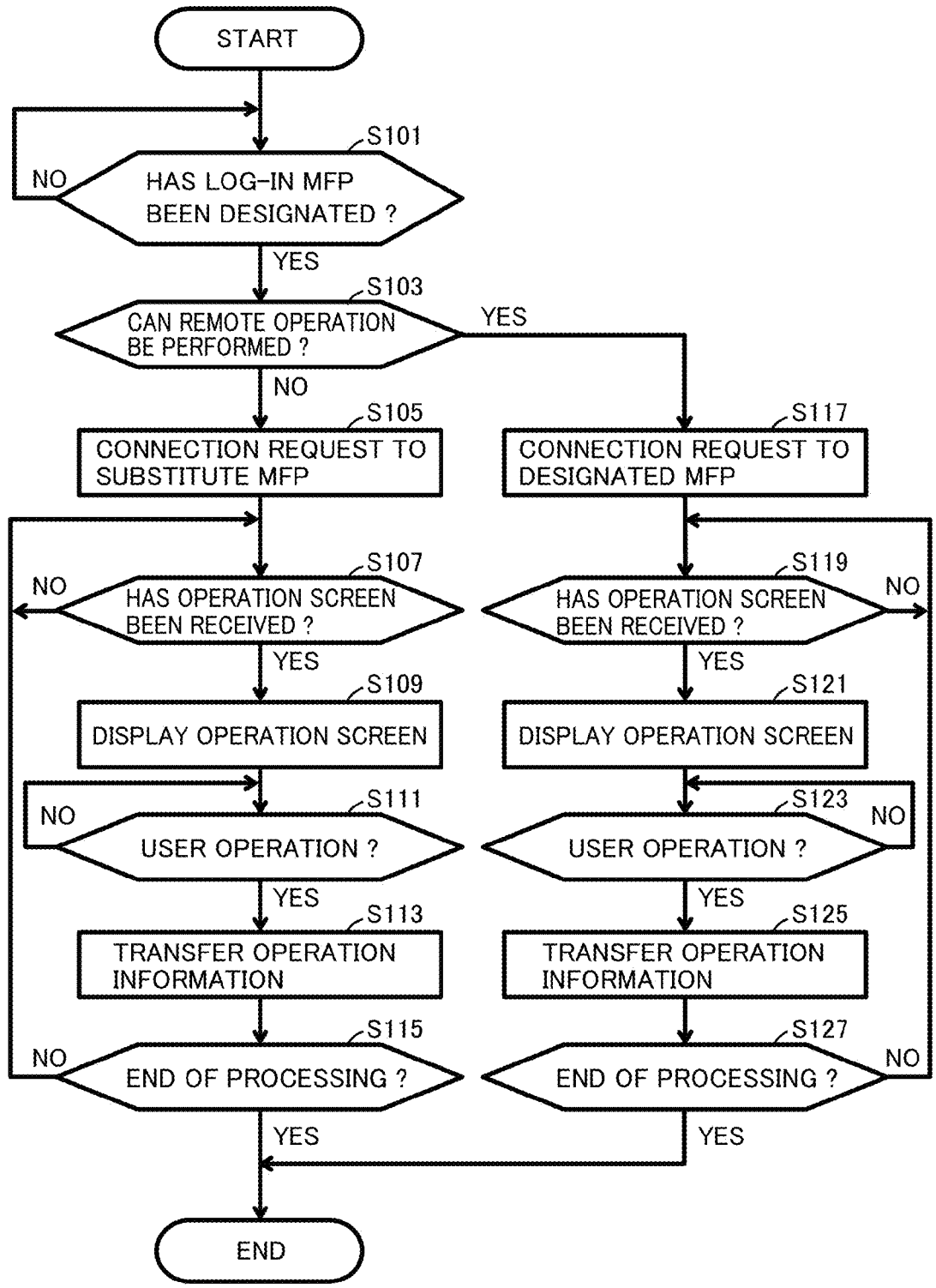
FIG. 7 is a flowchart representing one example of a flow of operations in the terminal apparatus.

FIG. 7 is a flowchart representing one example of a flow of operations in terminal apparatus 100. An operation shown in the flowchart in FIG. 7 is implemented as CPU 10 of terminal apparatus 100 reads a program stored in ROM 11 on RAM 12 and executes the program to thereby perform processing for implementing each function in FIG. 6.

Referring to FIG. 7, when CPU 10 accepts designation of an MFP in which a user desires to log (YES in step S101), it determines whether or not the designated MFP can remotely be operated. When designated MFP 300 cannot remotely be operated (NO in step S103), CPU 10 requests of another MFP stored in advance as a substitute MFP for connection (step S105).

When CPU 10 receives screen information which is information for displaying an operation screen from the substitute MFP (YES in step S107), it has touch panel 13 display the operation screen of the substitute MFP based on the screen information (step S109). Then, when an operation by the user onto the operation screen displayed on touch panel 13 is accepted (YES in step S111), CPU 10 transfers operation information representing the operation by the user to the substitute MFP (step S113). CPU 10 repeats the operations above until processing in accordance with the operation by the user ends (YES in step S115).

When designated MFP 300 can remotely be operated (YES in step S103), CPU 10 requests of the designated MFP for connection (step S117).

In this case, when CPU 10 receives screen information which is information for displaying an operation screen from the designated MFP (YES in step S119), it has touch panel 13 display the operation screen of the designated MFP based on the screen information (step S121). Then, when an operation by the user onto the operation screen displayed on touch panel 13 is accepted (YES in step S123), CPU 10 transfers operation information representing the operation by the user to the designated MFP (step S125). CPU 10 repeats the operations above until processing in accordance with the operation by the user ends (YES in step S127).

In the operations shown in FIG. 7, the operations in steps S107 to S115 and the operations in steps S117 to S127 are the same, although a difference resides in that an MFP which is a connection target is either a designated MFP or a substitute MFP. In step S109, however, the operation screen may be displayed in a manner different from the operation screen in a case that MFP 300 is the designated MFP, such that one can see that an operation is the operation in the substitute MFP.

Figure 8:
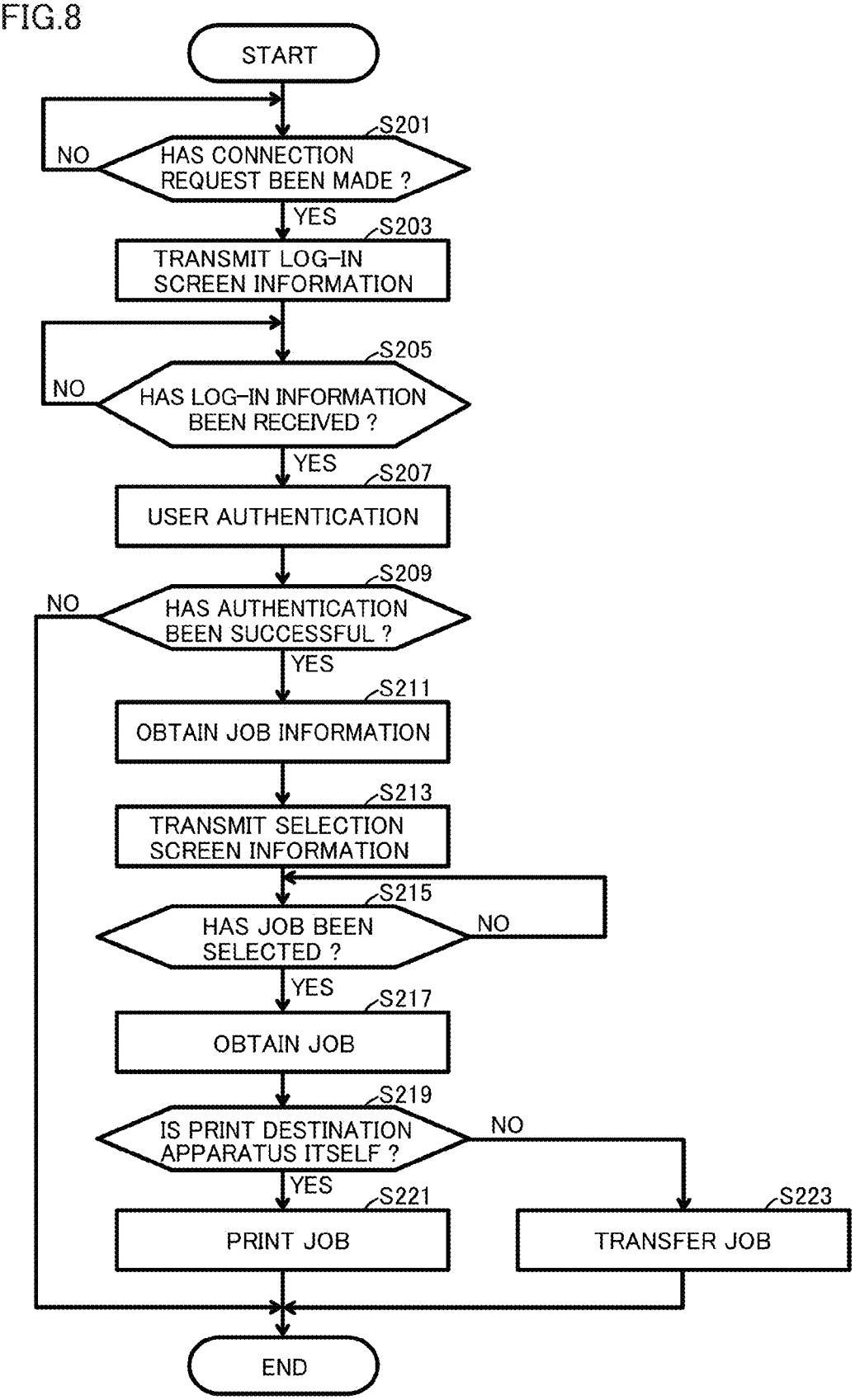
FIG. 8 is a flowchart representing one example of a flow of operations in the MFP.

FIG. 8 is a flowchart representing one example of a flow of operations in MFP 300. An operation shown in the flowchart in FIG. 8 is implemented as CPU 30 of MFP 300 reads a program stored in ROM 31 on RAM 32 and executes the program to thereby perform processing for implementing each function in FIG. 5.

Referring to FIG. 8, when CPU 30 of MFP 300 accepts a connection request from terminal apparatus 100 (YES in step S201), it transmits screen information for displaying a log-in screen to terminal apparatus 100 (step S203). When operation information representing log-in information is received from terminal apparatus 100 (YES in step S205), CPU 30 authenticates a user by using the log-in information (step S207).

When the user has successfully been authenticated (YES in step S209), CPU 30 accesses a job stored in association with the user who has logged in any apparatus in the present system or a storage accessible from the present system, and obtains job information on the job (step S211). Then, CPU 30 transmits to terminal apparatus 100, screen information on a selection screen for presenting job information in a selectable manner and accepting selection of a job to be printed from the user (step S213).

When CPU 30 receives operation information representing a result of selection from terminal apparatus 100 (YES in step S215), it obtains the selected job from an apparatus which stores the job (step S217).

In processing the job, CPU 30 branches processing depending on whether the job is to be printed in MFP 300 or another MFP. Whether the job is printed in the apparatus itself (MFP 300) or another MFP can be determined, for example, by referring to information included in the connection request accepted from terminal apparatus 100 in step S201. Namely, the request includes information specifying an MFP designated by the user as a log-in target through terminal apparatus 100, that is, an MFP where printing is to be carried out.

When a print destination is the apparatus itself (MFP 300) (YES in step S219), CPU 30 has the obtained job printed (step S221). When a print destination is another MFP (NO in step S219), CPU 30 transfers the job to an MFP where printing is to be carried out (step S223).

<Effect of Embodiment>

As the operations above are performed in the system according to the first embodiment, the user can have a designated MFP print a designated job by performing an operation as if the user remotely operated the MFP by using terminal apparatus 100 even though an MFP to which connection is requested for through terminal apparatus 100 in an attempt to have the job printed is an apparatus which cannot remotely be operated through terminal apparatus 100 due to a low function or excessive processing. Thus, convenience of the user of the present system can be improved.

[Second Embodiment]

In the first embodiment, a user of terminal apparatus 100 initially designates an MFP to remotely be operated. Thus, initially, an MFP to which connection is requested for through terminal apparatus 100 is branched depending on whether or not a designated MFP can remotely be operated. An order of operations is not limited to the order described above. In a system according to a second embodiment, a user of terminal apparatus 100 initially selects a job to be processed. Since each apparatus included in the system according to the second embodiment is the same as each apparatus included in the system according to the first embodiment, description of the apparatus configuration will not be repeated.

In the system according to the second embodiment, operations shown in steps S1 to S4 in FIG. 4 are not performed. Namely, when an application for remote panel is started up, CPU 10 of terminal apparatus 100 requests of MFP 300A stored in advance for connection and obtains representation information for displaying a log-in screen. MFP 300A stored in advance is, for example, an MFP used by the user at the highest frequency or an MFP closest to a current position. Then, CPU 10 has touch panel 13 display a log-in screen of MFP 300A.

The user enters log-in information through the displayed log-in screen and selects a job to be printed in a selection screen displayed thereafter. Then, in succession, the user selects an MFP where the job is to be printed. Therefore, in order to select a destination of printing of the job in the selection screen which presents job information on the job associated with the user who has logged in in a selectable manner, MFP 300A further presents each MFP included in the present system in a selectable manner.

When an MFP different from MFP 300A is designated as a destination of printing of a job, CPU 30 of MFP 300A transfers the designated job to the designated MFP.

An MFP where printing is to be carried out may be associated in advance with the designated job. Alternatively, an MFP where printing is to be carried out may be associated for each type of a job, not for each job. When MFP 300A accepts designation of a job, it can specify an MFP where printing is to be carried out based on the job. Then, when the destination of printing is not MFP 300A, the job is transferred to another MFP.

As the operations above are performed in the system according to the second embodiment, the user can have any MFP in the system print the designated job without being conscious about an MFP to be logged in. Thus, convenience of the user of the present system can be improved.

[Third Embodiment]

A plurality of terminal apparatuses may be included in the image processing system. Alternatively, a remote operation through terminal apparatus 100 and an operation through operation panel 36 of MFP 300 may both be present. Then, a case that a plurality of connection requests are issued to one MFP 300 will be described as a third embodiment. The third embodiment will be described with reference to the system according to the first embodiment and the system according to the second embodiment.

As set forth above, when MFP 300B designated by the user is an apparatus which cannot remotely be operated through terminal apparatus 100, terminal apparatus 100 requests of MFP 300A for connection. A request for connection may be issued from another terminal apparatus 100 to MFP 300A. Furthermore, in MFP 300A, operation panel 36 may be operated by the user.

In this case, preferably, MFP 300A performs processing in accordance with an operation onto operation panel 36 in parallel to processing in accordance with a remote operation through terminal apparatus 100. Namely, even when a remote operation through terminal apparatus 100 is performed, MFP 300A performs processing in accordance with the operation onto operation panel 36. In order to realize such processing, MFP 300A may incorporate a CPU (not shown) for performing processing in accordance with the operation onto operation panel 36 or a memory separately from CPU 30 for performing processing in accordance with a remote operation through terminal apparatus 100, so that they perform processing independently of each other.

In another example, preferably, MFP 300A assigns priorities to a plurality of connection requests and performs processing in the descending order of priority. By way of example, MFP 300A gives the highest priority to processing in accordance with an operation onto operation panel 36. Then, MFP 300A gives the second highest priority to processing in accordance with a remote operation through terminal apparatus 100 which has designated MFP 300A. Then, MFP 300A gives the lowest priority to processing in accordance with a remote operation through terminal apparatus 100 which has designated another MFP.

CPU 30 has the number of processes which can simultaneously be performed stored in advance for each of processing in which a print destination is set to the MFP itself and substitute processing in which a print destination is another MFP, and performs processing up to the number of processes which can be performed in accordance with the priority above.

As the operations above are performed in the system according to the third embodiment, concentration of processing in any MFP among MFPs 300 included in the present system and resultant excessive processing can be suppressed.

[Fourth Embodiment]

<System Configuration>

Figure 9:
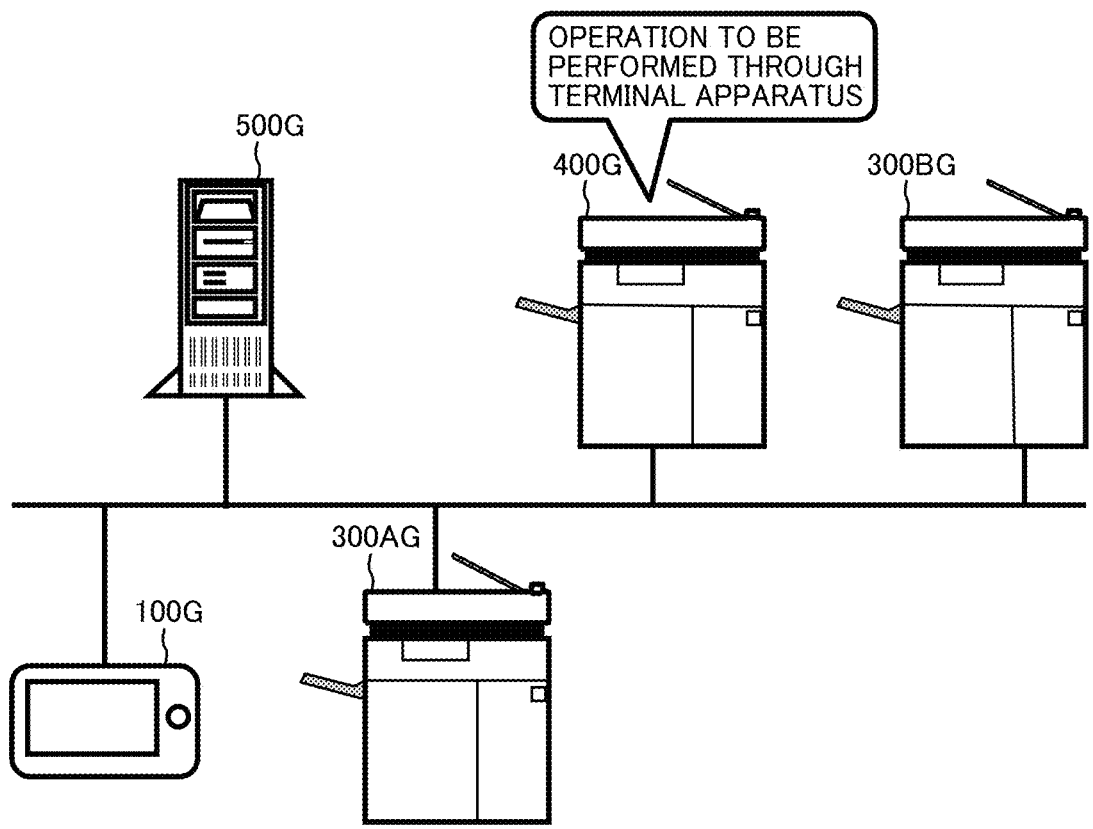
FIG. 9 is a diagram representing one example of a configuration of an image processing system (hereinafter abbreviated as the system) according to an embodiment.

FIG. 9 is a diagram representing one example of a configuration of an image processing system (hereinafter abbreviated as the system) according to the present embodiment. Referring to FIG. 9, the present system includes a terminal apparatus 100G, a plurality of multi-functional peripherals (MFPs) 300AG, 300BG, and 400G representing one example of an image formation apparatus, and a management server 500G. MFPs 300AG and 300BG are also representatively referred to as an MFP 300G.

Terminal apparatus 100G should only be an apparatus having a communication function, a display function, and an operation input function. Terminal apparatus 100G is, for example, an apparatus also called a tablet. Terminal apparatus 100G may be implemented by a common personal computer (PC).

Terminal apparatus 100G can communicate with each of a plurality of MFPs 300G and MFP 400G. Communication of terminal apparatus 100G with MFP 300G and MFP 400G may be wireless communication such as infrared communication or communication via a network such as local area network (LAN).

Management server 500G may be implemented by a common personal computer (PC). MFP 300G and MFP 400G may be implemented by a common MFP.

<Apparatus Configuration>

Figure 10:
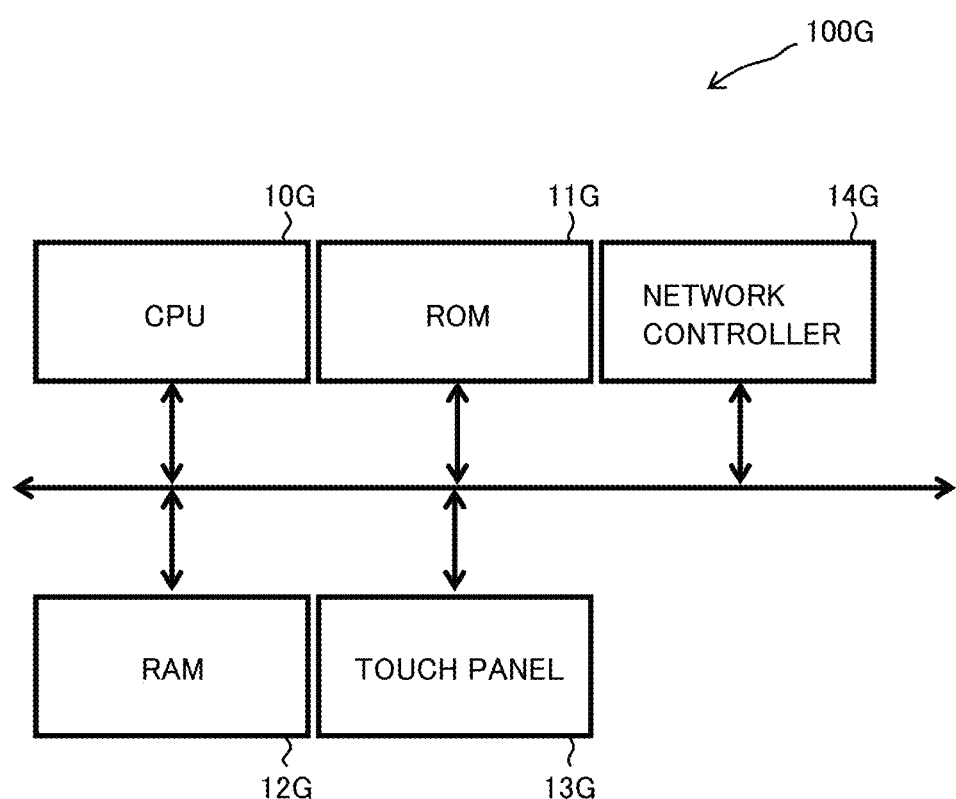
FIG. 10 is a block diagram showing a specific example of an apparatus configuration of a terminal apparatus included in the system.

FIG. 10 is a block diagram showing a specific example of an apparatus configuration of terminal apparatus 100G. Referring to FIG. 10, terminal apparatus 100G includes a central processing unit (CPU) 10G for overall control of an apparatus. Terminal apparatus 100G includes a read only memory (ROM) 11G for storing a program executed by CPU 10G or other data and a random access memory (RAM) 12G for storing a calculation value or serving as a work area in execution of a program by CPU 10G. Terminal apparatus 100G includes a touch panel 13G and a network controller 14G. Network controller 14G controls communication of terminal apparatus 100G with MFP 300G and MFP 400G.

Figure 11:
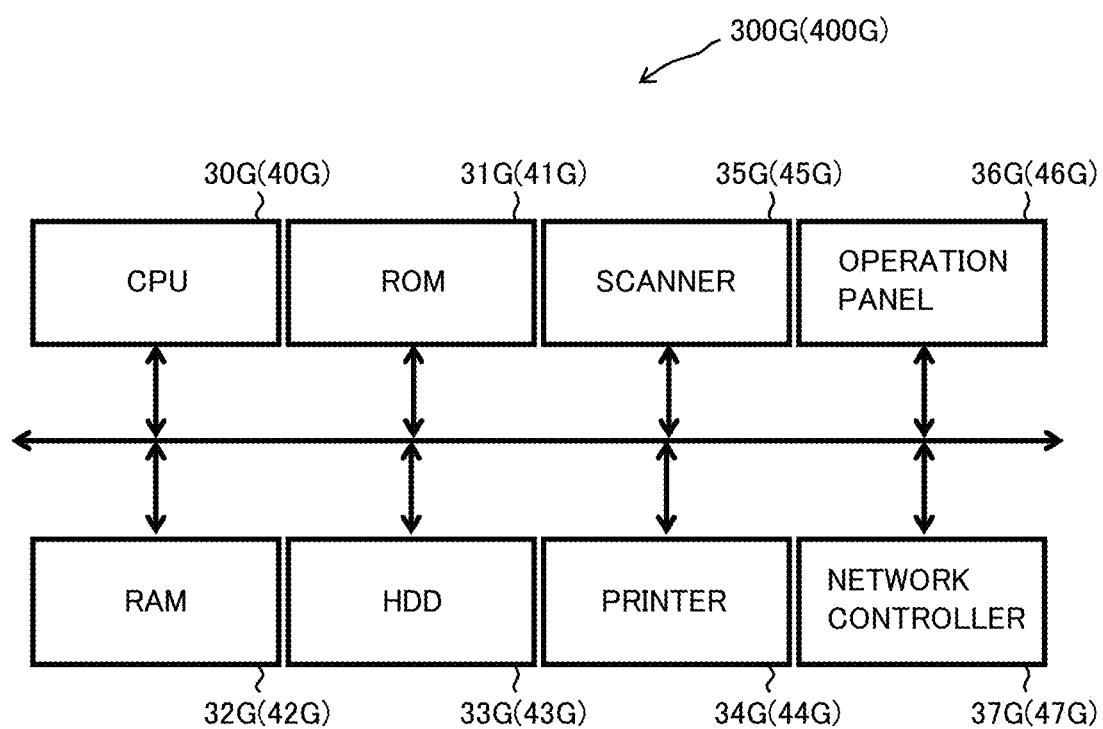
FIG. 11 is a block diagram showing a specific example of an apparatus configuration of a multi-functional peripheral (MFP) included in the system.

FIG. 11 is a block diagram showing a specific example of an apparatus configuration of MFP 300G. As set forth above, MFP 300G may be implemented by a common MFP, and FIG. 11 represents one example of an apparatus configuration of a common MFP. Since MFP 400G may also be implemented by a common MFP, a reference character in parentheses in FIG. 11 refers to an apparatus configuration of MFP 400G.

Referring to FIG. 11, MFP 300G includes a CPU 30G for overall control of an apparatus. MFP 300G includes a ROM 31G for storing a program executed by CPU 30G, a RAM 32G serving as a work area in execution of a program by CPU 30G, and a hard disk drive (HDD) 33G for storing image data or the like. MFP 300G includes a printer 34G and a scanner 35G as one example of an image formation mechanism. MFP 300G includes an operation panel 36G and a network controller 37G. Network controller 37G controls communication between MFP 300G and terminal apparatus 100G or communication between MFPs.

<Operation Overview>

A user issues a print job to the present system through a processing apparatus (not shown) such as a PC. The print job is stored in any MFP brought in correspondence in advance with the user, an MFP allocated at the time of issuance, or another apparatus (not shown) such as a document server. An MFP which stores a job issued by a user is also referred to as a storage MFP.

Thereafter, the user logs in any MFP. The MFP in which the user has logged is also referred to as a log-in MFP. The log-in MFP inquires of each MFP in the system about presence of a job associated with the user who has logged in, and obtains job information. Namely, the log-in MFP accesses one or more jobs associated with the user who has logged in and obtains job information from the job. The job information is, for example, information for specifying the job such as a job name or a time and day of creation of the job.

The log-in MFP presents to the user who has logged in, job information on one or more jobs associated with the user and stored in any MFP in the present system, in a selectable manner. The user selects a job to be printed in a selection screen. Selection of a job may be made with a method of selecting an option brought in correspondence with job information or a method of entering job information such as a job name.

The log-in MFP obtains the selected job from an MFP which stores the job and performs printing processing.

Thus, in the present system, the user can carry out printing of a designated job by logging in any MFP in the system without being conscious about in which apparatus a job issued by the user is stored. Such a printing method is also called ubiquitous printing.

A result of printing in each MFP is collectively managed in management server 500G for each user or user group, in order to set an upper limit for printing for each user or in order to allow charging of fees on printing Each MFP transmits a result of printing to management server 500G in association with information specifying a user such as a user name. Management server 500G performs counter processing based on the result of printing. The counter processing includes, for example, processing for counting (accumulating) the number of printed copies for each user or calculating an amount charged for printing.

Terminal apparatus 100G incorporates an application for implementing a function called what is called remote panel. Terminal apparatus 100G executes the application and accepts designation of an MFP to be logged in from the user. Then, terminal apparatus 100G obtains information for displaying an operation screen by accessing the designated MFP and has touch panel 13G display the operation screen of the designated MFP. When terminal apparatus 100G accepts an operation (touch) by the user onto the operation screen, it transmits information representing a position of operation to the designated MFP. When the MFP accepts the information from terminal apparatus 100G, it specifies contents of operation based on the information and performs processing in accordance with the operation.

Thus, the user of terminal apparatus 100G can remotely operate the designated MFP by using terminal apparatus 100G.

The user can request of the MFP in which the user attempts to log for carrying out printing for access thereto by making use of terminal apparatus 100G. The user can set the MFP as the log-in MFP through a remote operation by accessing the MFP through terminal apparatus 100G.

In some cases, however, an MFP designated as the log-in MFP cannot remotely be operated through terminal apparatus 100G. For example, the designated MFP may be a type low in function which does not have a user authentication function, a function to read a job from another apparatus, or a function to transmit a result of printing to management server 500G. In the present system, MFP 400G is such a type low in function as above and MFP 300G is a type high in function which has all the functions above. Since MFP 400G is the type which does not support the system for ubiquitous printing, it is also referred to as a non-supporting machine. In this case, MFP 400G cannot be set as the log-in MFP through a remote operation using terminal apparatus 100G. When MFP 400G is caused to perform printing processing, a result of printing is not accumulated in management server 500G and hence job processing information in the present system is not appropriately managed.

Then, in the present system, when MFP 400G is designated as an MFP (log-in MFP) which is to be logged in for carrying out printing, terminal apparatus 100G requests of MFP 300G substituting for designated MFP 400G for connection and has MFP 300G perform subsequent processing. MFP 300G supplements a function not supported by MFP 400G in response to an instruction from terminal apparatus 100G and has MFP 400G carry out printing. MFP 300G substituting for designated MFP 400G is also referred to as a substitute MFP in the description below. Therefore, terminal apparatus 100G or terminal apparatus 100G and MFP 300G serving as the substitute MFP can be defined as an information processing apparatus managing MFP 400G which is a non-supporting machine.

Figure 12:
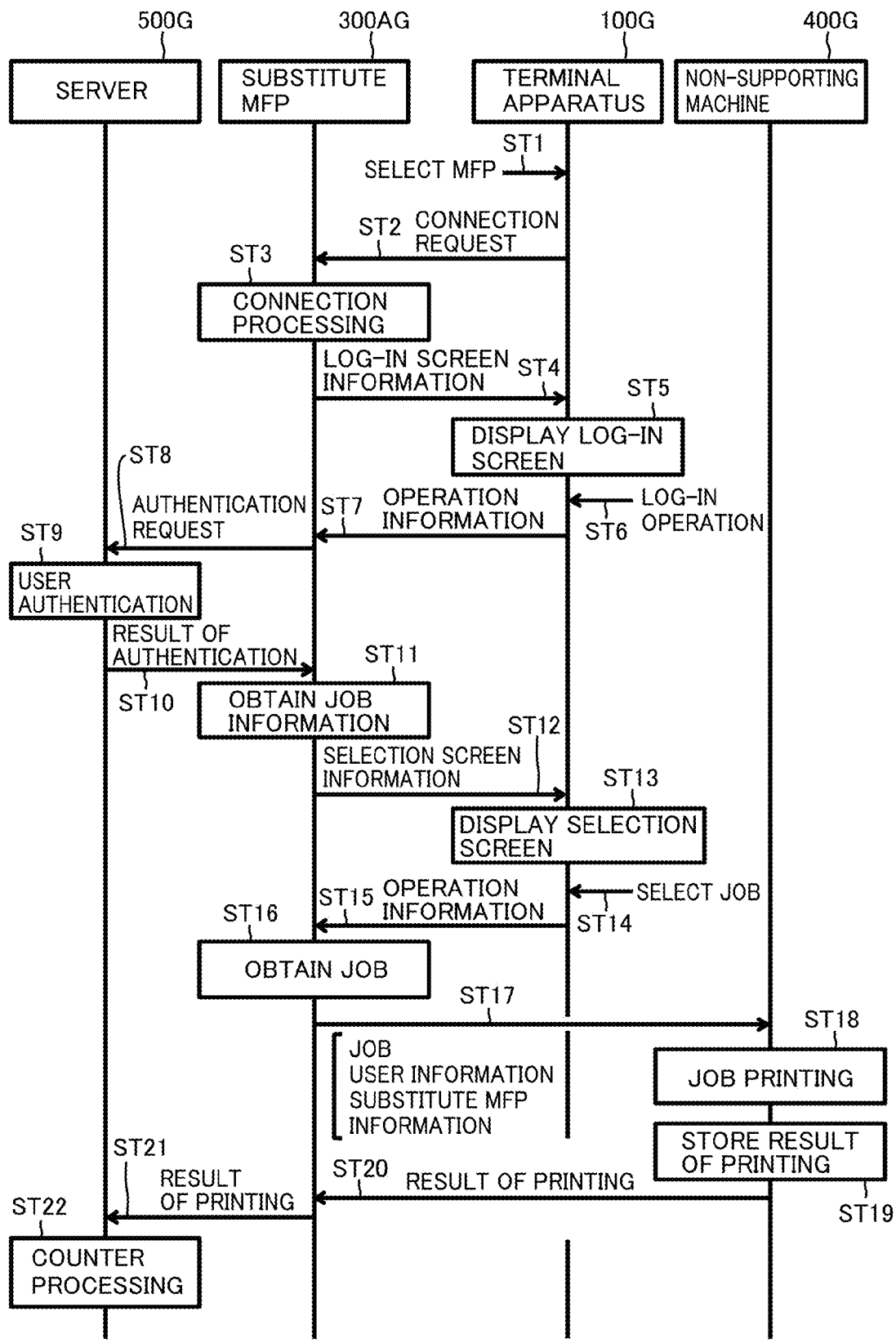
FIG. 12 is a diagram representing operation overview of the system.

FIG. 12 is a diagram representing operation overview of the present system. Referring to FIG. 12, terminal apparatus 100G starts up an application for remote panel in response to an operation by a user and accepts designation of MFP 400G as an MFP to be set as a log-in MFP from the user (step ST1).

When the application is started up, terminal apparatus 100 displays a not-shown menu screen, has the menu screen display a plurality of MFPs 300G and MFP 400G included in the present system in a selectable manner, and accepts selection (designation) of an MFP which is to be logged in for carrying out printing.

A user who desires to log in MFP 400G so as to have MFP 400G carry out printing can initially come closer to MFP 400G and attempt to perform an operation through an operation panel 46G. Then, preferably, as shown in FIG. 9, MFP 400G displays on operation panel 46G, a screen showing that an apparatus through which logging in MFP 400G can be performed is terminal apparatus 100G. This representation may be implemented by an application installed in MFP 400G. Preferably, MFP 400G is set to a panel lock state in which no operation onto operation panel 46G is accepted. More preferably, MFP 400G is set to the panel lock state when start of log-in for ubiquitous printing is indicated in a not-shown menu screen, and the panel lock state is canceled when start of common image processing (such as scanning) not involving log-in, that is, which is not ubiquitous printing, is indicated.

Terminal apparatus 100G stores in advance the fact that MFP 400G is a non-supporting machine. Then, when terminal apparatus 100G accepts designation of MFP 400G as an MFP which is to be logged in for carrying out printing, it requests of MFP 300AG serving as the substitute MFP for connection (step ST2).

Terminal apparatus 100G does not have to store in advance the fact that MFP 400G is the non-supporting machine. In this case, terminal apparatus 100G requests of MFP 400G for information on a function as the log-in MFP in requesting of designated MFP 400G for connection. Then, when it is determined that MFP 400G does not have a high function to serve as the log-in MFP based on the information from MFP 400G, terminal apparatus 100G may request of MFP 300AG serving as the substitute MFP for connection.

When terminal apparatus 100G requests of MFP 300AG which is the substitute MFP for connection in step ST2, it passes the information specifying MFP 400G designated as the log-in MFP to MFP 300AG together with the request.

MFP 300AG serving as the substitute MFP which has received a connection request performs processing for remote connection such as start-up of an application for remote panel (step ST3). Then, MFP 300AG transfers representation information for displaying a log-in screen to terminal apparatus 100G (step ST4). Terminal apparatus 100G which has received the information from MFP 300AG displays the log-in screen on touch panel 13G (step ST5).

When a log-in operation onto the displayed log-in screen is accepted from the user (step ST6), terminal apparatus 100G transfers operation information which is information representing a position of operation to MFP 300AG (step ST7). The operation information includes, for example, a coordinate representing a touch position on an operation screen.

MFP 300AG specifies contents of operation based on the operation information from terminal apparatus 100G. Namely, MFP 300AG specifies log-in information entered by the user in the log-in screen. Then, MFP 300AG authenticates the user with the log-in information.

By way of example, when management server 500G functions also as an authentication server, MFP 300AG transmits the input log-in information to management server 500G and requests for authentication (step ST8).

Management server 500G performs user authentication processing in response to the request from MFP 300AG (step ST9) and returns a result thereof to MFP 300AG (step ST10).

When authentication is successful, MFP 300AG accesses one or more jobs stored in association with the user on the present system and obtains job information on the job from the job (step ST11). MFP 300AG displays jobs associated with the user who has logged in in a list and generates a selection screen for presenting a job to be printed in a manner selectable from the list. Then, MFP 300AG transmits representation information for displaying a selection screen to terminal apparatus 100 (step ST12).

Terminal apparatus 100G which has received the representation information has the selection screen displayed on touch panel 13G based on the information (step ST13). When an operation by the user to select a job in the selection screen displayed on touch panel 13G is accepted (step ST14), terminal apparatus 100G transfers operation information representing the operation by the user to MFP 300AG (step ST15).

MFP 300AG specifies contents of operation based on the operation information from terminal apparatus 100G. Namely, MFP 300AG specifies the selected job. Then, MFP 300AG obtains the selected job from an apparatus which stores the job (step ST16).

As set forth above, the connection request from terminal apparatus 100G includes information identifying MFP 400G designated through terminal apparatus 100G as the log-in MFP by the user. Then, MFP 300AG can determine that a subsequent operation is performed as the operation by the substitute MFP for MFP 400G at the time point of reception of the connection request. Alternatively, when a source of input of a control signal is terminal apparatus 100G, MFP 300AG may determine that it serves as the substitute MFP, and when the source of input is operation panel 36G, it may determine that MFP 300AG is the log-in MFP. Alternatively, when a document has been set on scanner 35G at the time of input of a control signal, MFP 300AG may determine that MFP 300AG is the log-in MFP, and otherwise, it may determine that it serves as the substitute MFP.

MFP 300AG serving as the substitute MFP issues the job obtained in step ST16 to MFP 400G designated as the log-in MFP (step ST17). In step ST17, MFP 300AG issues the job to MFP 400G together with information specifying the user and information specifying MFP 300AG. Here, MFP 300AG may transmit the job to MFP 400G after it performs processing necessary for printing of the job on the job. The job does not have to directly be issued from MFP 300AG to MFP 400G. Namely, MFP 300AG may once transfer the job to terminal apparatus 100G and then terminal apparatus 100G may forward the job to MFP 400G. Any operation can be concluded as issuance of a job from an information processing apparatus to MFP 400G serving as the log-in MFP.

MFP 400G which has accepted the job prints the job (step ST18). Then, MFP 400G stores a result of printing in association with the information specifying the user (step ST19). The result of printing is, for example, the number of printed copies, the number of printed copies for each of color printing and monochrome printing, and the number of printed copies for each job, and MFP 400G stores such results as counter information for each user.

MFP 400G transmits the counter information of the user who has logged in to MFP 300AG which has issued the job (step ST20). Transmission in step ST20 may be carried out at the time point when MFP 400G completed printing of the job, in response to a request from MFP 300AG, or in response to a request from management server 500G through MFP 300AG or terminal apparatus 100G.

MFP 300AG which has obtained the counter information of the user who has logged in from MFP 400G transmits the counter information to management server 500G (step ST21). Preferably, MFP 300AG serving as the substitute MFP converts a protocol used for communication with MFP 400G to a protocol used for communication with management server 500G and then transmits the counter information to management server 500G. Management server 500G can perform the counter processing described above based on the received result of printing (step ST22).

<Functional Configuration>

Figure 13:
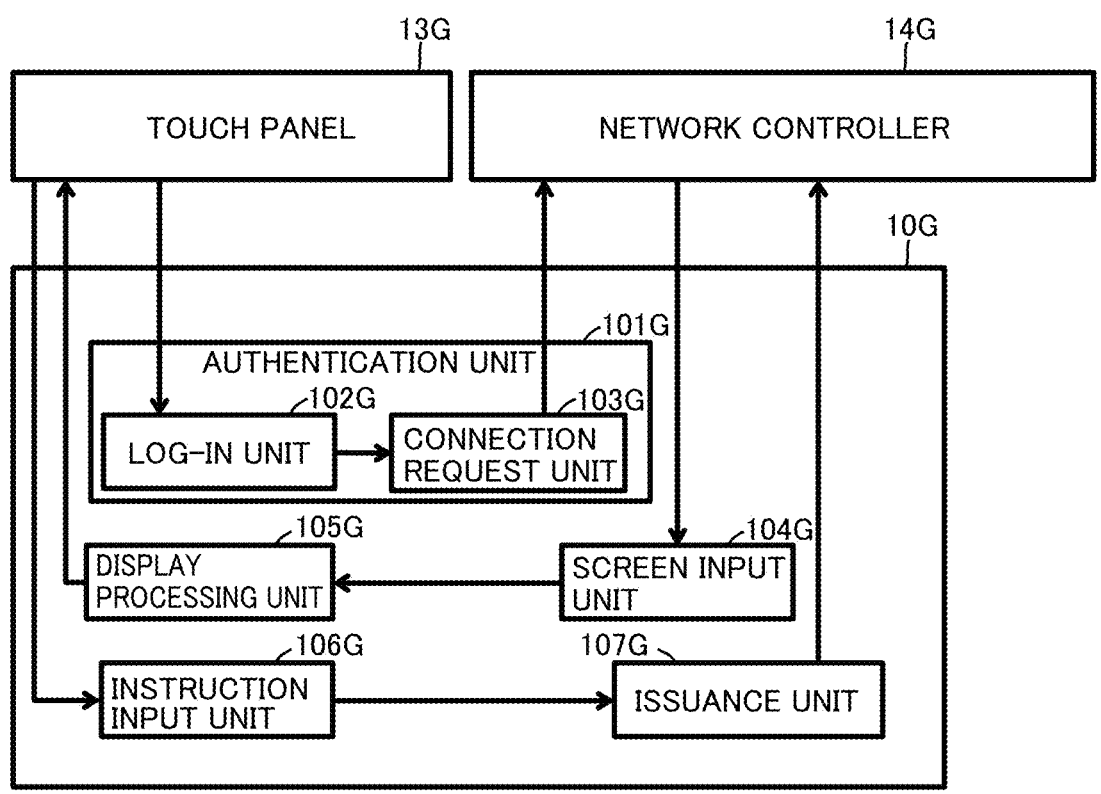
FIG. 13 is a block diagram representing one example of a functional configuration of the terminal apparatus.

FIG. 13 is a block diagram representing one example of a functional configuration of terminal apparatus 100G for performing the operations above. Each function in FIG. 13 is mainly implemented by CPU 10G as CPU 10G of terminal apparatus 100G reads a program stored in ROM 11G on RAM 12G and executes the program. A partial function, however, may be implemented by hardware shown in FIG. 10 or other hardware such as an electric circuit (not shown).

Referring to FIG. 13, CPU 10G of terminal apparatus 100G includes an instruction input unit 106G for accepting an instruction input representing an operation by a user onto touch panel 13G. An instruction from the user accepted by instruction input unit 106G includes designation of an MFP to remotely be operated through terminal apparatus 100G.

CPU 10G further includes an authentication unit 101G, a screen input unit 104G, a display processing unit 105G, and an issuance unit 107G. Authentication unit 101G further includes a log-in unit 102G and a connection request unit 103G. Log-in unit 102G accepts input of log-in information. When an MFP, logging in which has been requested for, is MFP 400G, connection request unit 103G requests of MFP 300G serving as the substitute MFP for connection.

Screen input unit 104G accepts input of screen information from MFP 300G. Display processing unit 105G has touch panel 13G display an operation screen of MFP 300G to which connection has been requested for, based on the screen information.

Issuance unit 107G passes information specifying a job selected as a job to be processed in response to an operation by the user to MFP 300G and indicates issuance of the corresponding job to MFP 400G.

Figure 14:
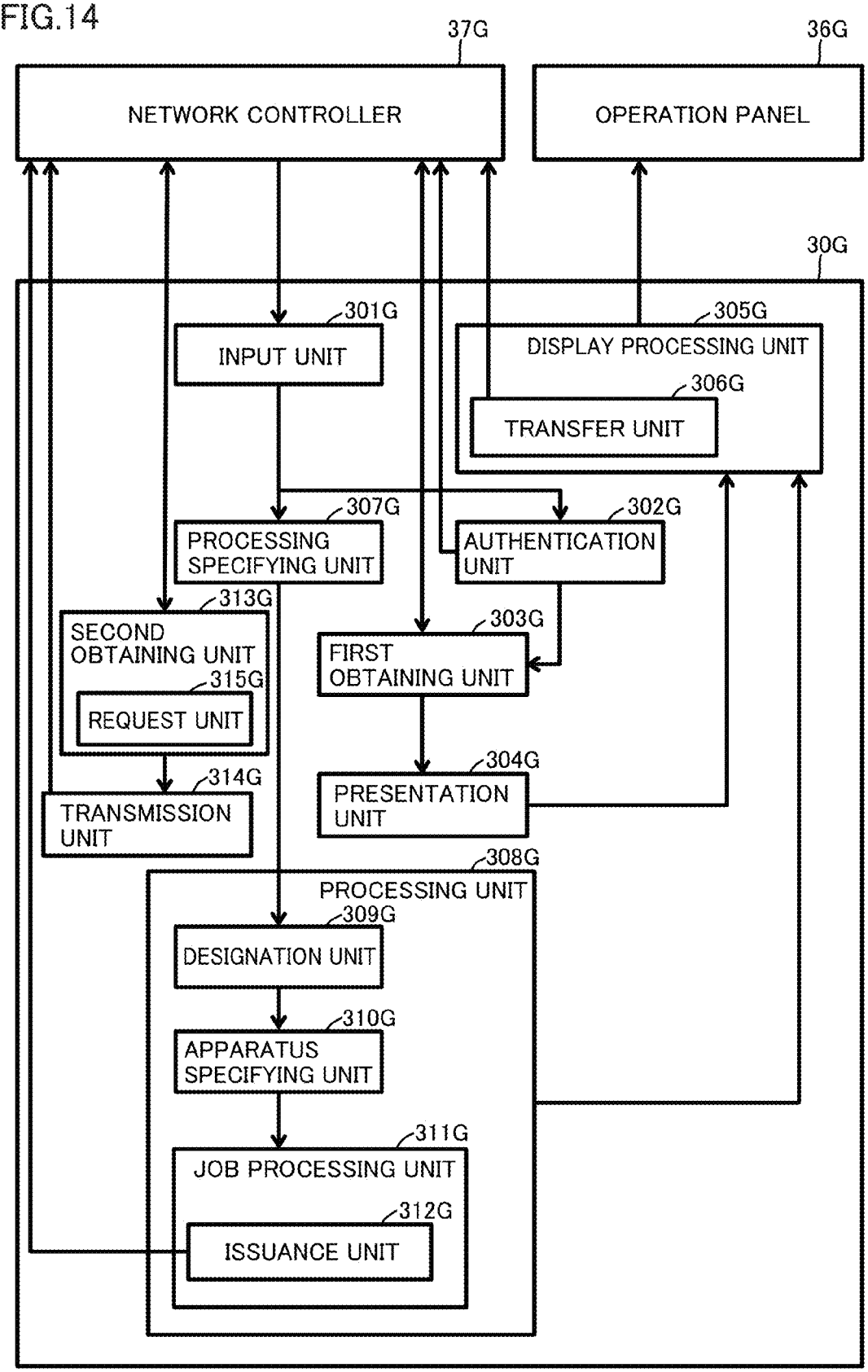
FIG. 14 is a block diagram representing one example of a functional configuration of the MFP functioning as a substitute MFP.

FIG. 14 is a block diagram representing one example of a functional configuration of MFP 300G for performing the operations above. Each function in FIG. 14 is mainly implemented by CPU 30G as CPU 30G of MFP 300G reads a program stored in ROM 31G on RAM 32G and executes the program. A partial function, however, may be implemented by hardware shown in FIG. 11 or other hardware such as an electric circuit (not shown).

Referring to FIG. 14, CPU 30G of MFP 300G includes an input unit 301G for accepting input of operation information from terminal apparatus 100G. CPU 30G includes an authentication unit 302G for authenticating a user by using log-in information when the operation information is log-in information. Authentication unit 302G may authenticate a user by comparing authentication information stored in advance with the log-in information. Alternatively, authentication unit 302G may transmit log-in information to management server 500G and request for user authentication.

CPU 30G further includes a first obtaining unit 303G, a presentation unit 304G, a second obtaining unit 313G, and a transmission unit 314G. First obtaining unit 303G obtains job information on a job associated with the user or a job when user authentication has been successful. Presentation unit 304G presents the job information obtained by first obtaining unit 303G. Second obtaining unit 313G obtains counter information representing a result of printing for the user who has logged in from MFP 400G. Transmission unit 314G transmits the counter information from MFP 400G to management server 500G. Preferably, second obtaining unit 313G includes a request unit 315G for requesting of MFP 400G for transmission of the counter information.

CPU 30G further includes a display processing unit 305G. Display processing unit 305G generates screen information which is information for displaying an operation screen and performs processing for having a display apparatus display the operation screen. When the display apparatus is implemented by operation panel 36G of MFP 300G, display processing unit 305G controls display on operation panel 36G. Display processing unit 305G includes a transfer unit 306G. When the display apparatus is implemented by touch panel 13G of terminal apparatus 100G, transfer unit 306G transfers screen information to terminal apparatus 100G.

CPU 30G further includes a processing specifying unit 307G for specifying processing indicated based on operation information and a processing unit 308G for performing indicated processing. Processing unit 308G performs such processing as printing of a designated job, as the indicated processing.

Processing unit 308G further includes a designation unit 309G, an apparatus specifying unit 310G, and a job processing unit 311G. Designation unit 309G accepts designation of a job to be printed. Apparatus specifying unit 310G specifies an apparatus which should print a job. When a connection request from terminal apparatus 100G includes information indicating another MFP as an MFP designated by the user through terminal apparatus 100G as a connection target, apparatus specifying unit 310G specifies an apparatus which should print the job as another MFP based on the connection request.

Job processing unit 311G controls processing for printing a job in MFP 300G. Job processing unit 311G includes an issuance unit 312G for issuing a job. When an apparatus which should print a job is MFP 400G, issuance unit 312G issues a job to MFP 400G. Here, issuance unit 312G issues information specifying the user who has logged in and information specifying MFP 300G together with the job.

Figure 15:
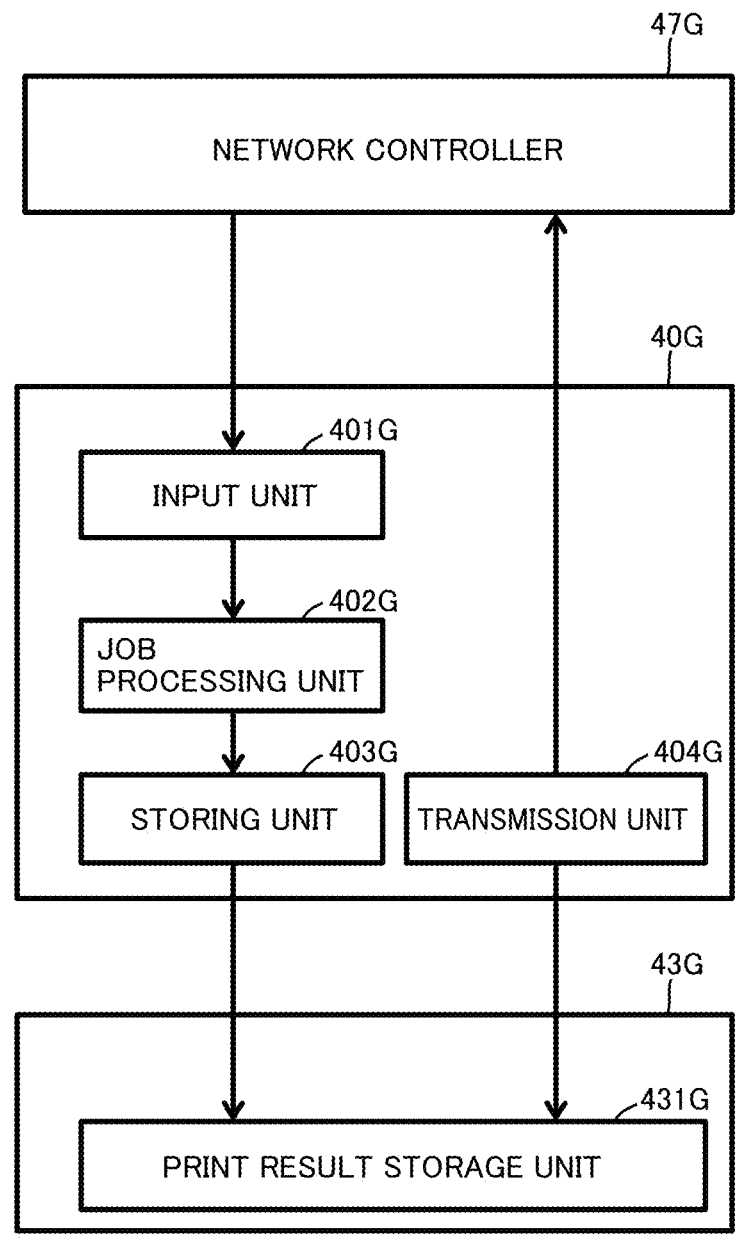
FIG. 15 is a block diagram representing one example of a functional configuration of an MFP which is a non-supporting machine.

FIG. 15 is a block diagram representing one example of a functional configuration of MFP 400G for performing the operations above. Each function in FIG. 15 is mainly implemented by CPU 40G as CPU 40G of MFP 400G reads a program stored in ROM 41G on RAM 42G and executes the program. A partial function, however, may be implemented by hardware shown in FIG. 11 or other hardware such as an electric circuit (not shown).

Referring to FIG. 15, CPU 40G of MFP 400G includes an input unit 401G, a job processing unit 402G, a storing unit 403G, and a transmission unit 404G.

Input unit 401G accepts input of a job issued from MFP 300G serving as the substitute MFP. Job processing unit 402G controls printing processing of the input job in MFP 400G. Storing unit 403G has a print result storage unit 431G in an HDD 43G representing one example of a memory store a result of printing as counter information, in association with information specifying a user, which has been issued together with the job. Transmission unit 404G transmits the result of printing which is the counter information associated with the information specifying the user to MFP 300G based on the information specifying MFP 300G, which has been issued together with the job. Transmission unit 404G may transmit the result of printing to MFP 300G at the timing of completion of printing of the job or may transmit the result of printing to MFP 300G in response to a request from MFP 300G or management server 500G.

<Operation Flow>

Figure 16:
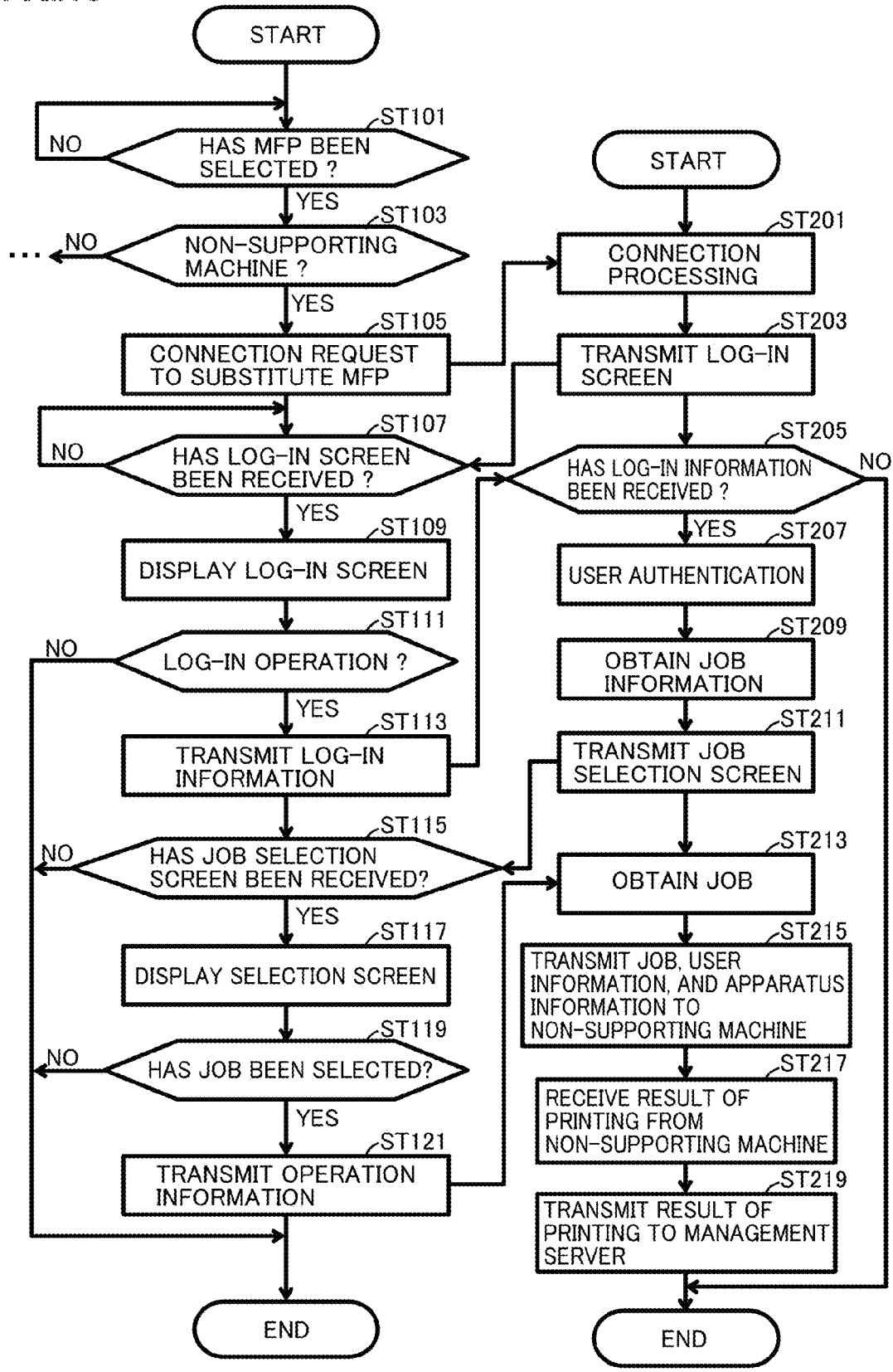
FIG. 16 is a flowchart representing one example of a flow of operations in each of the terminal apparatus and the MFP.

FIG. 16 is a flowchart representing one example of a flow of operations in each of terminal apparatus 100G and MFP 300G. Operations shown in the flowchart on the left in FIG. 16 are implemented as CPU 10G of terminal apparatus 100G reads a program stored in ROM 11G on RAM 12G and executes the program to thereby perform processing for implementing each function in FIG. 13. Operations shown in the flowchart on the right in FIG. 16 are implemented as CPU 30G of MFP 300G reads a program stored in ROM 31G on RAM 32G and executes the program to thereby perform processing for implementing each function in FIG. 14.

Referring to FIG. 16, CPU 10G of terminal apparatus 100G accepts selection of an MFP to be set as a log-in MFP (YES in step ST101). When the designated MFP is MFP 400G which is a non-supporting machine (YES in step ST103), a request for connection is issued to MFP 300G serving as a substitute MFP (step ST105). In requesting in step ST105, CPU 10G transmits also information specifying MFP 400G serving as the log-in MFP to MFP 300G.

CPU 30G of MFP 300G which has accepted a connection request from terminal apparatus 100G performs connection processing (step ST201). Then, CPU 30G transmits representation information for displaying a log-in screen to terminal apparatus 100G (step ST203).

When CPU 10G of terminal apparatus 100G receives the representation information for displaying a log-in screen from MFP 300G (YES in step ST107), the log-in screen is displayed on touch panel 13G (step ST109). When an operation for log-in onto the log-in screen by a user is accepted (YES in step ST111), CPU 10G transmits the log-in information to MFP 300G by transmitting a position of operation on the screen to MFP 300G (step ST113).

CPU 30G of MFP 300G which has accepted the log-in information from terminal apparatus 100G (YES in step ST205) authenticates a user with the use of the log-in information (step ST207). By way of example, CPU 30G transmits the log-in information to management server 500G and requests for user authentication. When log-in has been successful, CPU 30G obtains job information of a job associated with the user from MFP 300G which holds the job, among MFPs 300G belonging to the present system (step ST209). Then, CPU 30G generates a selection screen which displays a list of jobs for selecting a job and transmits screen representation information to terminal apparatus 100G (step ST211).

When CPU 10G of terminal apparatus 100G receives the representation information for displaying the screen for selecting a job from MFP 300G (YES in step ST115), it has touch panel 13G display the screen for selecting a job (step ST117). When an operation by the user to select (designate) a job is accepted in the screen for selecting a job (YES in step ST119), CPU 10G transmits information specifying the designated job to MFP 300G by transmitting a position of operation on the screen to MFP 300G (step ST121).

CPU 30G of MFP 300G which has accepted the information specifying the designated job from terminal apparatus 100G obtains the corresponding job from MFP 300G which holds the job (step ST213). Then, CPU 30G issues the designated job to MFP 400G which is the log-in MFP (step ST215). In step ST215, CPU 30G transmits to MFP 400G, also the information specifying the user who has logged in and information specifying MFP 300G together with the designated job.

CPU 30G of MFP 300G receives a result of printing as counter information of the user from MFP 400G which is the log-in MFP (step ST217). The counter information may automatically be transmitted from MFP 400G after printing processing is performed in MFP 400G, may be transmitted from MFP 400G in response to a request from MFP 300G to MFP 400G, or may be transmitted from MFP 400G in response to a request to MFP 400G when MFP 300G accepts a request from management server 500G. CPU 30G transmits the counter information representing the result of printing in MFP 400G associated with the information specifying the user, which has been obtained from MFP 400G, to management server 500G (step ST219).

Figure 17:
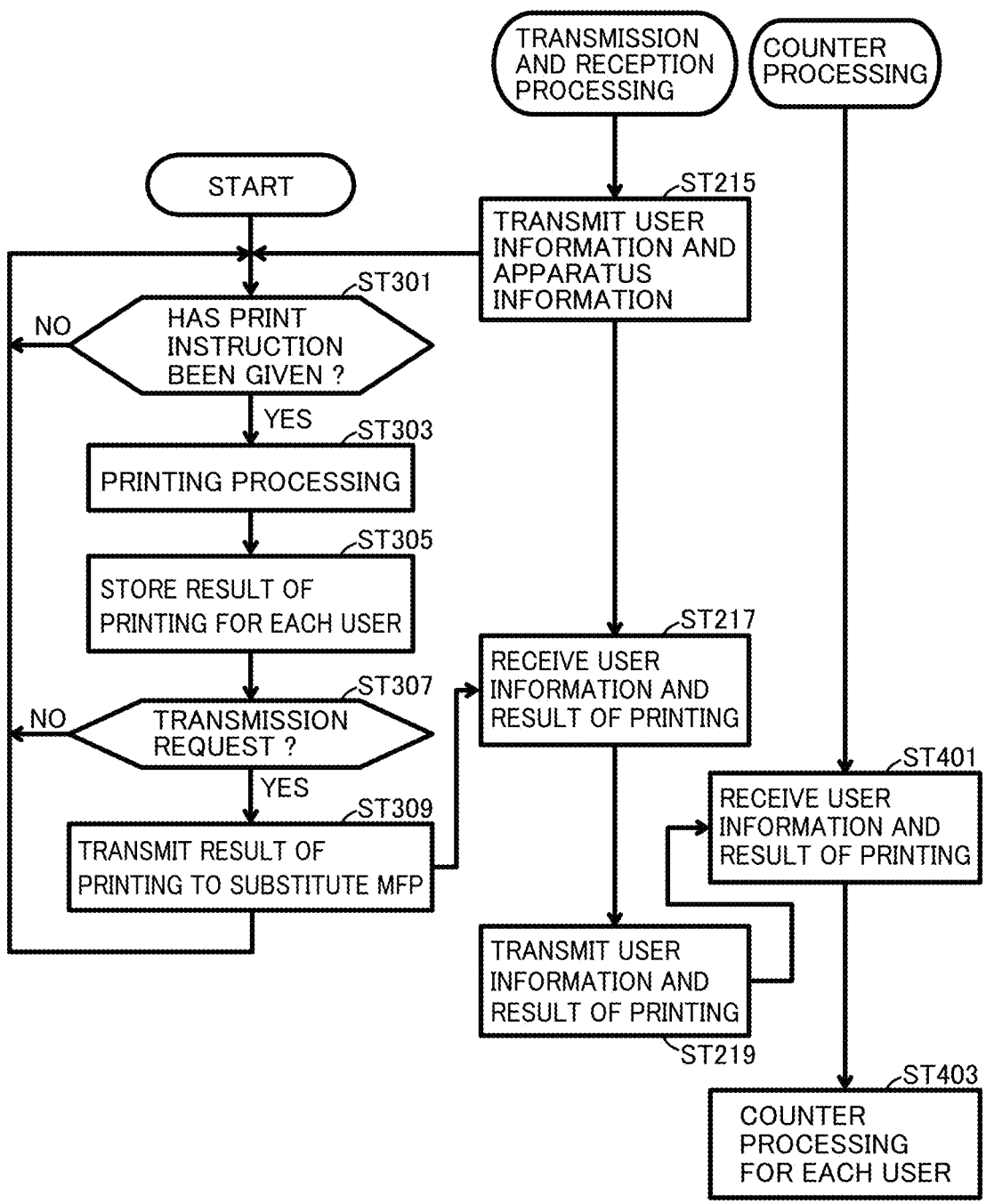
FIG. 17 is a flowchart representing one example of a flow of operations in the MFP which is the non-supporting machine.

FIG. 17 is a flowchart representing one example of a flow of operations in MFP 400G which is the non-supporting machine. FIG. 17 also shows associated operations in MFP 300G (in the center) serving as the substitute MFP and management server 500G (right end) together with the operations in MFP 400G. Operations shown in the flowchart in FIG. 17 are implemented as CPU 40G of MFP 400G reads a program stored in ROM 41G on RAM 42G and executes the program to thereby perform processing for implementing each function in FIG. 15.

Referring to FIG. 17, CPU 40G of MFP 400G accepts user information and apparatus information which is information specifying MFP 300G, which have been transmitted in step ST215 from MFP 300G serving as the substitute MFP, together with a job. When a job is passed from MFP 300G serving as the substitute MFP to CPU 40G of MFP 400G and CPU 40G of MFP 400G accepts an instruction for printing (YES in step ST301), printing is performed in response to the instruction (step ST303).

When printing is completed, CPU 40G has a result of printing stored in association with the information specifying the user, which has been passed from MFP 300G, together with the job (step ST305). CPU 40G has the result of printing stored for each user. Preferably, in step ST305, CPU 40G has the information indicating MFP 300G serving as the substitute MFP further stored in association with the result of printing for each user.

CPU 40G transmits the stored result of printing to MFP 300G (step ST309), for example, at timing requested by MFP 300G (YES in step ST307). When the result of printing is transmitted at the time of completion of printing, CPU 40G transmits the result of printing to MFP 300G based on the information specifying MFP 300G, which has been passed together with the job. When the result of printing is transmitted in response to the request from MFP 300G, CPU 40G transmits to MFP 300G, the result of printing with which MFP 300G which has made a request is associated as the substitute MFP, among stored results of printing, in association with the user.

CPU 40G repeats the operations above each time it accepts an instruction for printing from MFP 300G serving as the substitute MFP.

MFP 300G serving as the substitute MFP receives in step ST217, the result of printing transmitted from MFP 400G in step ST309. Then, MFP 300G transmits in step ST219, the counter information representing the result of printing associated with the received user information to management server 500G.

Management server 500G receives the counter information representing the result of printing associated with the user information, which has been transmitted from MFP 300G in step ST219 (step ST401). Then, management server 500G performs counter processing for each user based on the counter information (step ST403).

<Other Examples>

In the description above, terminal apparatus 100G and MFP 300G are apparatuses different from each other, and the terminal apparatus and MFP 300G function as the information processing apparatuses which manage MFP 400G. In another example, a function of terminal apparatus 100G described above may be incorporated in MFP 300G. Namely, MFP 300G alone may function as the information processing apparatus which manages MFP 400G. In this case, a user operates MFP 400G through an operation screen displayed on operation panel 36G of MFP 300G, without using remote panel.

<Effect of Embodiment>

As the present system performs the operations above, low-function MFP 400G which does not have a high function allowing for ubiquitous printing is included in the present system. Even when MFP 400G low in function is designated as a log-in MFP, a user can remotely operate MFP 400G low in function through terminal apparatus 100G or substitute MFP 300G without being conscious about such a fact, and has a designated job printed. Therefore, convenience of the user can be improved.

Furthermore, even when MFP 400G low in function does not have a function to transmit a result of printing to management server 500G, in the present system, MFP 300G can transmit the result of printing to management server 500G as a substitute. Thus, even though MFP 400G low in function is designated as an MFP to carry out printing, job processing can appropriately be managed in the present system.

[Fifth Embodiment]

The disclosed feature is implemented by one or more modules. For example, the feature can be implemented by a circuit element and other hardware modules, software modules defining processing implementing the feature, or combination of the hardware modules and the software modules.

A program for having CPU 10 of terminal apparatus 100 or CPU 30 of MFP 300 perform the processing described above can also be provided. By providing such a program, a general-purpose terminal apparatus called what is called a tablet can function as terminal apparatus 100. In addition, the present system can readily be constructed with already-existing MFPs.

A program which is combination of one or more software modules for having the operations described above performed by an information processing apparatus such as terminal apparatus 100G or MFP 300G and MFP 400G can also be provided. By providing such a program, an already-existing terminal apparatus or MFP can function as the information processing apparatus above and the present system can readily be constructed.

Such a program can also be recorded on a computer-readable recording medium such as a flexible disk, a CD-ROM (Compact Disk-Read Only Memory), a ROM, a RAM, and a memory card adapted to a computer, and can be provided as a program product. Alternatively, the program can also be recorded and provided in a recording medium such as a hard disk contained in the computer. Further, the program can also be provided by downloading through the network.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present disclosure.

Alternatively, the program according to the present disclosure may be provided in a manner incorporated as a part of another program. In such a case as well, the program itself does not include the module included in another program, but the program executes the processing in cooperation with another program. Such a program incorporated in another program may also be encompassed in the program according to the present disclosure.

The provided program product is installed in a program storing unit such as a hard disk for execution. It is noted that the program product includes the program itself and the recording medium recording the program.

[Additional Aspects]

The present application includes also the invention according to the following.

(1) A method of processing a print job in an image processing system that includes a plurality of image formation apparatuses, the plurality of image formation apparatuses each being able to communicate with a terminal apparatus, including:

the terminal apparatus accepting a request for connection to a first image formation apparatus among the plurality of image formation apparatuses from a user;

the terminal apparatus requesting of a second image formation apparatus different from the first image formation apparatus for connection when the first image formation apparatus cannot remotely be operated through the terminal apparatus;

transferring representation information for displaying an operation screen of the second image formation apparatus from the second image formation apparatus to the terminal apparatus in response to a request from the terminal apparatus;

transferring to the second image formation apparatus, operation information representing an operation by the user onto the operation screen displayed on the terminal apparatus based on the representation information from the terminal apparatus; and performing processing based on the operation information in the second image formation apparatus, the performing processing in the second image formation apparatus including transferring the print job from the second image formation apparatus to the first image formation apparatus when the processing based on the operation information is processing of a print job associated with the user in the first image formation apparatus.

(2) A non-transitory computer-readable storage medium storing a program for controlling a computer mounted on an image formation apparatus, the control program causing the computer to perform:

transferring representation information for displaying an operation screen of the image formation apparatus to a display apparatus;

accepting input of operation information representing an operation by a user onto the operation screen displayed on the display apparatus based on the representation information;

accessing one or more print jobs associated with the user;

obtaining information for specifying the print job associated with the user from the print job;

displaying the specifying information on the display apparatus;

accepting designation of a print job to be processed from among the one or more print jobs associated with the user based on the operation information;

specifying a processing apparatus to process the print job designated to be processed; and having the print job issued to the another image formation apparatus when the processing apparatus is another image formation apparatus different from the image formation apparatus.

(3) An image processing system in which an image formation apparatus without a prescribed function and an information processing apparatus having the prescribed function are connected to be able to communicate with each other, the information processing apparatus including an authentication unit that authenticates a user, a designation unit that designates the image formation apparatus as an image formation apparatus which is to print a print job of the approved user, and an issuance unit that issues an instruction for printing of the print job to the designated image formation apparatus together with user information specifying the user and substitute apparatus information specifying the information processing apparatus, the image formation apparatus including a print execution unit that prints the print job based on the received instruction for printing, a storage unit that stores a result of printing of the print job issued from the information processing apparatus for each piece of user information, and a transmission unit that transmits the result of printing associated with the user information to the information processing apparatus based on the substitute apparatus information, and the information processing apparatus further including an obtaining unit that obtains the result of printing associated with the user information.

(4) The image processing system according to (3), wherein the information processing apparatus is an image formation apparatus that has an authentication function.

(5) The image processing system according to (3), wherein the information processing apparatus is a portable terminal that has an authentication function.

(6) The image processing system according to (3), wherein the prescribed function is an authentication function.

(7) The image processing system according to (3), wherein the prescribed function is a function to read a job from another apparatus.

(8) The image processing system according to (3), wherein the prescribed function is a function to transmit the result of printing to a management server.

(9) The image processing system according to (3), wherein the image formation apparatus is configured to indicate to a user, the information processing apparatus as an apparatus to be logged in.

(10) A method of managing a print job in an image processing system in which an image formation apparatus without a prescribed function and an information processing apparatus having the prescribed function are connected to be able to communicate with each other, including:

the information processing apparatus authenticating a user;

the information processing apparatus designating the image formation apparatus as an image formation apparatus which is to print a print job of the approved user;

the information processing apparatus issuing an instruction for printing of the print job to the designated image formation apparatus together with user information specifying the user and substitute apparatus information specifying the information processing apparatus;

the image formation apparatus printing the print job based on the received instruction for printing;

the image formation apparatus storing a result of printing of the print job issued from the information processing apparatus for each piece of user information;

the image formation apparatus transmitting the result of printing associated with the user information to the information processing apparatus based on the substitute apparatus information; and the information processing apparatus obtaining the result of printing associated with the user information from the image formation apparatus.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A terminal apparatus that can remotely operate an image formation apparatus, comprising:
    a user input device that accepts an operation by a user to designate an image formation apparatus to remotely be operated; and
    a hardware processor configured to:
    request representation information from the image formation apparatus for displaying an operation screen;
    transfer operation information to the image formation apparatus, the operation information representing the operation by the user onto the operation screen displayed based on the representation information, the operation information being transferred after the image formation apparatus has sent the representation information to the terminal apparatus; and
    determine whether the image formation apparatus designated by the user on the user input device can remotely be operated,
    wherein when the hardware processor determines that the designated image formation apparatus cannot remotely be operated, the hardware processor requests another image formation apparatus stored in advance for the representation information, the another image formation apparatus being different from the designated image formation apparatus, and the hardware processor transferring the operation information to the another image formation apparatus together with information specifying the designated image formation apparatus.

2. The terminal apparatus according to claim 1, wherein the hardware processor determines whether the image formation apparatus can remotely be operated based on at least one of: (i) a function of the designated image formation apparatus, and (ii) a condition of processing.

3. The terminal apparatus according to claim 1, wherein when the hardware processor remotely controls the another image formation apparatus, the hardware processor causes the another image formation apparatus to instruct the designated image formation apparatus to execute a job.

4. A non-transitory computer-readable storage medium storing a program for controlling a terminal apparatus that can communicate with a predetermined group of a plurality of image formation apparatuses, the control program causing a computer mounted on the terminal apparatus to perform:
    accepting a request for connection to a first image formation apparatus from a user;
    determining whether the first image formation apparatus can remotely be operated through the terminal apparatus;
    requesting of a second image formation apparatus different from the first image formation apparatus for connection when the first image formation apparatus cannot remotely be operated through the terminal apparatus;
    accepting input of representation information for displaying an operation screen of the second image formation apparatus from the second image formation apparatus, in response to the request from the terminal apparatus; and
    transferring, to the second image formation apparatus, operation information representing an operation by the user onto the operation screen displayed on the terminal apparatus based on the representation information together with information specifying the first image formation apparatus.

5. A terminal apparatus that can remotely operate an image formation apparatus, comprising:
    a display configured to accept a touch operation by a user on the display;
    a network controller configured to communicate with a first image formation apparatus and a second image formation apparatus; and
    a hardware processor configured to:
    cause the network controller to request representation information from the first image formation apparatus to display a remote operation screen on the display;
    determine whether the first image formation apparatus can be remotely operated by the terminal apparatus based on the representation information requested from the first image formation apparatus;
    transfer operation information via the network controller to the image formation apparatus when the hardware processor determines the first image formation apparatus can be remotely operated, the operation information corresponding to the touch operation by the user on the remote operation screen on the display; and
    when the hardware processor determines that the first image formation apparatus cannot be remotely operated:
        cause the network controller to request the representation information from the second image formation apparatus,
        determine whether the second image formation apparatus can be remotely operated, and
        transfer the operation information and information specifying an identity of the first image formation apparatus to the second image formation apparatus via the network controller when the hardware processor determines that the second image formation apparatus can be remotely operated.

6. The terminal apparatus according to claim 5, wherein when the hardware processor remotely controls the second image formation apparatus, the hardware processor causes the second image formation apparatus to instruct the first image formation apparatus to execute a job.

* * * * *